(12) United States Patent
Abbas et al.

(10) Patent No.: US 9,438,431 B2
(45) Date of Patent: Sep. 6, 2016

(54) METHOD OF TRANSMITTING TRAFFIC IN A COMMUNICATIONS NETWORK AND COMMUNICATIONS NETWORK APPARATUS

(75) Inventors: Ghani Abdul Muttalib Abbas, Nottingham (GB); Philip Andrew Arnold, Warwickshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 523 days.

(21) Appl. No.: 13/221,283

(22) Filed: Aug. 30, 2011

(65) Prior Publication Data

US 2012/0057450 A1 Mar. 8, 2012

Related U.S. Application Data

(63) Continuation of application No. PCT/EP2010/062858, filed on Sep. 2, 2010.

(51) Int. Cl.
| | | |
|---|---|---|
| *H04L 12/12* | (2006.01) | |
| *H04L 5/14* | (2006.01) | |
| *H04L 25/02* | (2006.01) | |
| *H04L 12/825* | (2013.01) | |

(Continued)

(52) U.S. Cl.
CPC ............ *H04L 12/12* (2013.01); *H04L 5/1446* (2013.01); *H04L 25/0262* (2013.01); *H04L 47/25* (2013.01); *H04L 49/90* (2013.01); *H04L 47/30* (2013.01); *Y02B 60/34* (2013.01)

(58) Field of Classification Search
CPC ................................. H04L 65/4092
USPC ................. 370/216, 229, 235, 236
See application file for complete search history.

(56) References Cited

U.S. PATENT DOCUMENTS

| | | | | |
|---|---|---|---|---|
| 5,583,922 | A * | 12/1996 | Davis et al. ............... | 379/93.09 |
| 5,801,781 | A * | 9/1998 | Hiroshima ....... | H04N 21/23608 |
| | | | | 348/441 |
| 5,831,978 | A * | 11/1998 | Willars et al. ................ | 370/335 |

(Continued)

FOREIGN PATENT DOCUMENTS

| | | |
|---|---|---|
| EP | 1 775 894 | 4/2007 |
| JP | H05-153128 | 6/1993 |

(Continued)

OTHER PUBLICATIONS

Kubo, et al "Sleep and Adaptive Link Rate Control for Power Saving in 10G-EPON Systems" Global Telecommunications Conference, 2009 pp. 1-6, XP031645857, ISBN: 978-1-4244-4148-8, Nov. 30, 2009.

(Continued)

*Primary Examiner* — Dang Ton
*Assistant Examiner* — Kevin Lee
(74) *Attorney, Agent, or Firm* — Baker Botts, LLP

(57) ABSTRACT

A method 10 of transmitting traffic in a communications network. The method comprises receiving client signal having a client bit rate and comprising traffic to be transmitted 12 and monitoring an indicator indicative of said client bit rate 12. The method further comprises setting a transmission bit rate at which to transmit the traffic 16. The transmission bit rate is set in dependence on said client bit rate. The method further comprises generating and transmitting a control signal arranged to cause a transmission apparatus to transmit the traffic at the transmission bit rate 18.

19 Claims, 18 Drawing Sheets

(51) Int. Cl.
*H04L 12/861* (2013.01)
*H04L 12/835* (2013.01)

(56) References Cited

U.S. PATENT DOCUMENTS

| | | | |
|---|---|---|---|
| 7,042,908 B1 | 5/2006 | Mayer | |
| 2006/0209712 A1 | 9/2006 | Morioka | |
| 2007/0071033 A1 | 3/2007 | Surek | |
| 2007/0086481 A1* | 4/2007 | Klemets | 370/466 |
| 2007/0206947 A1 | 9/2007 | Natarajan | |
| 2007/0248121 A1 | 10/2007 | Zou | |
| 2008/0002679 A1 | 1/2008 | Dunstan | |
| 2008/0253770 A1* | 10/2008 | Mori | 398/59 |
| 2009/0022214 A1 | 1/2009 | Locke | |
| 2009/0187778 A1 | 7/2009 | Diab | |
| 2009/0225773 A1 | 9/2009 | Winter | |
| 2009/0327506 A1 | 12/2009 | Diab | |
| 2010/0021173 A1 | 1/2010 | Zhang | |
| 2010/0067905 A1 | 3/2010 | Dong | |
| 2010/0080245 A1 | 4/2010 | Kisaka | |
| 2010/0226648 A1* | 9/2010 | Katagiri et al. | 398/66 |

FOREIGN PATENT DOCUMENTS

| | | |
|---|---|---|
| JP | 2007-288655 | 11/2007 |
| JP | 2009-296231 | 12/2009 |
| JP | 2010-074214 | 4/2010 |
| WO | WO 00/31990 | 6/2000 |
| WO | WO 03/034185 | 4/2003 |

OTHER PUBLICATIONS

PCT Notification of Transmittal of the International Search Report and the Written Opinion of the International Searching Authority, or the Declaration, International Application No. PCT/EP2010/062858, 24 pages, Jul. 7, 2011.

ITU-T "Series G: Transmission Systems and Media, Digital Systems and Networks", "Digital terminal equipments—General", "Series Y: Global Information Infrastructure, Internet Protocol Aspects and Next-Generation Networks", "Internet protocol aspects—Transport", "Interfaces for optical transport network", G.709/Y.1331, 238 pages, Feb. 2012.

* cited by examiner

METHOD OF TRANSMITTING TRAFFIC IN A COMMUNICATIONS NETWORK AND COMMUNICATIONS NETWORK APPARATUS

This application is a continuation of International Application No. PCT/EP2010/062858 filed 2 Sep. 2010, which designated the U.S., the entire contents of which is hereby incorporated by reference.

TECHNICAL FIELD

The invention relates to a method of transmitting traffic in a communications network. The invention further relates to a communications network transmission element. The invention further relates to a communications network element. The invention further relates to a communications network. The invention further relates to a method of framing traffic for transmission in a communications network. The invention further relates to a method of controlling transmission of traffic in a communications network.

BACKGROUND

Improving the power efficiency of electrical products is receiving an increasing amount of attention both for consumer goods and professional goods. Telecommunications operators are beginning to specify minimum power efficiency for the products they buy and Standards bodies for telecommunications are introducing features to improve power efficiency. As yet, telecommunications transmission products have not been effectively addressed and many of them consume the same amount of power irrespective of the amount of traffic they are carrying. For example, in packet networks transponders make up the bulk of the power consumption requirements and use the same power regardless of whether the optical channel payload unit (OPU) content comprises empty or filled packets. Burst mode transmission has been proposed to reduce power consumption when little traffic is to be carried by turning off the transmitter between bursts. However this requires additional overhead in order to provide clock and burst synchronisation. In addition, burst mode transmission is incompatible with most installed wavelength division multiplexed (WDM) communications network infrastructure, that has been designed for continuous transmission. For example, Erbium doped fibre amplifiers and power monitors used in the optical transport network are generally unsuitable to carry burst mode transmission.

SUMMARY

It is an object to provide an improved method of transmitting traffic in a communications network. It is a further object to provide an improved communications network transmission element. It is a further object to provide an improved communications network element. It is a further object to provide an improved communications network. It is a further object to provide an improved method of framing traffic for transmission in a communications network. It is a further object to provide an improved method of controlling transmission of traffic in a communications network.

A first aspect of the invention provides a method of transmitting traffic in a communications network. The method comprises receiving a client signal having a client bit rate and comprising traffic to be transmitted and monitoring an indicator indicative of said client bit rate. The method further comprises setting a transmission bit rate at which to transmit the traffic. The transmission bit rate is set in dependence on said client bit rate. The method further comprises generating and transmitting a control signal arranged to cause a transmission apparatus to transmit the traffic at the transmission bit rate.

The method may enable the transmission bit rate to be reduced in response to receiving a client signal having a client bit rate which is less than a maximum transmission bit rate at which traffic can be transmitted across the network. Reducing the transmission bit rate may reduce power consumption during transmission of traffic. The method may enable power consumption to be varied to match the received traffic load. The method may enable traffic transmission to continue continuously but at a lower transmission bit rate than the maximum for the network or the capability of the transmission apparatus and may thus enable the method to be used in connection with currently installed wavelength division multiplexed network infrastructure.

In an embodiment, the transmission bit rate is set by determining a divide ratio for a master bit rate in dependence on said client bit rate. The control signal comprises a clock signal generated by receiving a master clock signal at the master bit rate and dividing the master clock signal by the divide ratio. This may provide a simple mechanism for setting the transmission bit rate and generating the control signal. The transmission bit rate is varied by varying the divide ratio while the master clock signal has a constant master bit rate. This may ease clock recovery at a receiver which can run at a constant bit rate locked to an incoming signal.

In an embodiment, the bit rate is set by selecting a divide ratio from a set of divide ratios in dependence on said quantity of traffic. This may further simplify operation of the method as it is only necessary to select an appropriate one of a set of divide ratios rather than determining a divide ratio. In an embodiment, an intermediate bit rate is set by periodically switching between each of a plurality of divide ratios selected from the set of divide ratios. The intermediate bit rate comprises an average of the bit rates at the said divide ratios.

In an embodiment, the method comprises receiving a first client signal having a first client bit rate and comprising first traffic to be transmitted and subsequently receiving a second client signal having a second client bit rate and comprising second traffic to be transmitted. A first transmission bit rate is set by monitoring an indicator indicative of the first client bit rate and a second transmission bit rate is set by monitoring an indicator indicative of the second client bit rate. The method further comprises generating and transmitting a first control signal and a second control signal. The first control signal is arranged to cause a framer to frame the first traffic into one or more first frames at the first transmission bit rate. The second control signal arranged to cause the framer to frame the second traffic into one or more subsequent frames at the second transmission bit rate. Where the second transmission bit rate is different to the first transmission bit rate, the second control signal is further arranged to cause the framer to implement the change from the first transmission bit rate to the second transmission bit rate at a frame boundary. Changing the bit rate only at a frame boundary may ensure that a clean change over is achieved from the first transmission bit rate to the second transmission bit rate and may prevent spillage of traffic from a first frame into a subsequent frame.

In an embodiment, the first control signal is arranged to cause the framer to frame a part of the first traffic in a payload of a said first frame. The first control signal is further arranged to cause the framer to provide information indicative of the second transmission bit rate in an overhead of said first frame. This may enable a receiver receiving the traffic to track changes in the transmission bit rate and to prepare to receive traffic at a different transmission bit rate.

In an embodiment, the frame comprises an optical transport network frame. In an embodiment, the optical transport network frame comprises an optical transport network frame as defined in ITU-T Recommendation G.709. In an embodiment, the control signal is arranged to cause the framer to provide information indicative of the second transmission bit rate in one of: byte 15 of one of rows 1 and 2 of the overhead of said first frame; one of bytes 13 to 15 of row 3 of the overhead of said first frame; and one of bytes 9 to 14 and 16 of row 4 of the overhead of said first frame. The information may therefore be provided in any available bytes of the overhead which are not being used in connection with transmission of the traffic, including byte 16 in rows 1 to 4 which are usually allocated for justification control but which are not required in this method since justification control is only required when transporting constant bit rate traffic.

In an embodiment, the control signal is arranged to cause the framer to provide said information indicative of the second transmission bit rate in a first plurality of said bytes. The first plurality of bytes is located in a second plurality of rows of the overhead. This may provide redundancy against transmission errors.

In an embodiment, the information indicative of the second transmission bit rate comprises a plurality of bits coded to indicate that the second bit rate comprises one of: a master bit rate; one half of the master bit rate; one third of the master bit rate; and one quarter of the master bit rate.

In an embodiment, the information indicative of the second transmission bit rate comprises three bits coded as one of: 001 to indicate the master bit rate; 010 to indicate one half of the master bit rate; 100 to indicate one third of the master bit rate; and 110 to indicate one quarter of the master bit rate.

In an embodiment, the method further comprises receiving transmitted traffic at receiver apparatus and determining whether a value for the transmission bit rate is available. If a value for the transmission bit rate is not available, the method further comprises causing a further transmission apparatus to generate and transmit a recovery signal. The recovery signal is arranged to cause the transmission apparatus to transmit traffic at a default transmission bit rate. Backward information may therefore be sent from the receiver apparatus to the transmission apparatus to inform the transmission apparatus that the receiver apparatus has lost the bit rate. Transmitting traffic at a default transmission bit rate may ease regaining of transmission bit rate and frame synchronisation at the receiver apparatus. In an embodiment, the recovery signal is arranged to cause the remote transmission apparatus to re-transmit the traffic on a transport signal at the default transmission bit rate. The risk of losing traffic for which the transmission bit rate was not available at the receiver apparatus may therefore be reduced.

In an embodiment, the recovery signal is transmitted at a pre-determined recovery signal transmission bit rate. The method comprises framing the recovery signal in a payload of a frame and providing a recovery signal identifier in an overhead of the frame. In an embodiment, the recovery signal identifier comprises two bits coded as 10.

In an embodiment, the receiver apparatus comprises a receiver soft decision and equaliser and the method further comprises providing the transmission bit rate to the receiver soft decision and equaliser. This may make it easier to predict threshold levels for the soft decision and equaliser.

In an embodiment, the method comprises receiving the or each said client signal in an input traffic queue buffer and monitoring the rate at which the queue buffer is filled. In an embodiment, the rate at which the queue buffer is filled is monitored by monitoring when a fill level of the queue buffer reaches a threshold fill level. In an embodiment, the input traffic queue buffer comprises a first-in-first-out buffer. Using an input traffic queue buffer may reduce latency variation because when the queue buffer is filled traffic is transmitted at a higher transmission bit rate.

In an embodiment, the indicator comprises a client bit rate signal indicative of the client bit rate. In an embodiment, the client bit rate signal is received from a network management system. In an embodiment, the communications network comprises an optical transport network. The transmission bit rate is determined by an optical channel transport unit clock rate. In an embodiment, the communications network comprises a synchronous digital hierarchy network. The transmission bit rate is determined by a synchronous transport module of the network.

In an embodiment, the communications network is an optical packet network.

In an embodiment, the method further comprises de-framing the received transmitted traffic and holding the de-framed traffic in a queue buffer until a complete packet of traffic has been received, and then delivering the de-framed traffic to an output client signal interface. This may prevent packet under-run when received transmitted traffic has a lower transmission bit rate than the output client signal bit rate In an embodiment, the method further comprises obtaining a temperature of the transmission apparatus and the divide ratio is further set in dependence on the temperature. Reducing the transmission bit rate in dependence on the ambient temperature may reduce the power required for cooling the transmission apparatus. The method may therefore be used to throttle the transmission bit rate if the ambient temperature rises above a threshold value. This may be implemented when the client bit rate is lower than the maximum transmission bit rate capability of the transmission apparatus.

A second aspect of the invention provides a communications network transmission element comprising an input, client signal monitoring apparatus, transmission bit rate control apparatus and transmission apparatus. The input is arranged to receive a client signal having a client bit rate and comprising traffic to be transmitted. The client signal monitoring apparatus is arranged to monitor an indicator indicative of said client bit rate. The transmission bit rate control apparatus is arranged to set a transmission bit rate at which to transmit the received traffic. The transmission bit rate is set in dependence on said client bit rate. The transmission bit rate control apparatus is further arranged to generate and transmit a control signal arranged to cause a transmission apparatus to transmit the traffic at the transmission bit rate. The transmission apparatus is arranged to receive the control signal and to generate and transmit a transport signal carrying the traffic.

The transmission element may be able to reduce the transmission bit rate in response to receiving a client signal having a client bit rate which is less than a maximum transmission bit rate capability of the transmission element. Reducing the transmission bit rate may reduce power consumption in the transmission element, particularly in the transmission apparatus. The power consumption of the transmission element may therefore be varied to match the received traffic load. The transmission element may enable traffic transmission to continue continuously but at a lower transmission bit rate than its maximum capacity and may thus be used within currently installed wavelength division multiplexed network infrastructure.

In an embodiment, the transmission bit rate control apparatus comprises a controller, a clock and a divider. The controller is arranged to determine a divide ratio in dependence on said client bit rate. The clock is arranged to generate a master clock signal having a master bit rate. The divider is arranged to receive the divide ratio and to divide the master clock signal at the divide ratio to form the control signal. The transmission bit rate control apparatus may therefore operate with a simple mechanism for setting the transmission bit rate and generating the control signal. The transmission bit rate is varied by varying the divide ratio while the master clock signal has a constant master bit rate. This may ease clock recovery at a receiver which can run at a constant bit rate locked to an incoming signal.

In an embodiment, the divide ratio is selected from a set of divide ratios in dependence on said quantity of traffic. This may further simplify operation of the transmission bit rate control apparatus as it must only select an appropriate one of a set of divide ratios rather than determining a divide ratio. In an embodiment, the controller is arranged to set the bit rate at an intermediate bit rate by periodically switching between each of a plurality of divide ratios selected from the set of divide ratios. The intermediate bit rate comprises an average of the bit rates at the said divide ratios.

In an embodiment, the input is arranged to receive a first client signal having a first client bit rate and comprising first traffic to be transmitted and to subsequently receive a second client signal having a second client bit rate and comprising second traffic to be transmitted. The transmission apparatus comprises a framer. The transmission bit rate control apparatus is arranged to set a first transmission bit rate in dependence on the first client bit rate at which to transmit the first traffic. The transmission bit rate control apparatus is arranged to set a second transmission bit rate in dependence on the second client bit rate at which to transmit the second traffic. The transmission bit rate control apparatus is further arranged to generate and transmit a first control signal arranged to cause the framer to frame the first traffic into one or more first frames at the first transmission bit rate. The transmission bit rate control apparatus is further arranged to generate and transmit a second control signal arranged to cause the framer to frame the second traffic into one or more subsequent frames at the second transmission bit rate. Where the second transmission bit rate is different to the first transmission bit rate, the second control signal is further arranged to cause the framer to implement the change from the first transmission bit rate to the second transmission bit rate at a frame boundary. Causing the bit rate to change only at a frame boundary may ensure that a clean change over is achieved from the first transmission bit rate to the second transmission bit rate and may prevent spillage of traffic from a first frame into a subsequent frame.

In an embodiment, the first control signal is arranged to cause the framer to frame a part of the first traffic in a payload of a said first frame. The first control signal is further arranged to cause the framer to provide information indicative of the second transmission bit rate in an overhead of the first frame. This may enable a receiver receiving the traffic to track changes in the transmission bit rate and to prepare to receive traffic at a different transmission bit rate.

In an embodiment, the frame is an optical transport network frame. In an embodiment, the optical transport network frame comprises an optical transport network frame as defined in ITU-T Recommendation G.709. In an embodiment, the control signal is arranged to cause the framer to provide information indicative of the second transmission bit rate in one of: byte 15 of one of rows 1 and 2 of the overhead of said first frame; one of bytes 13 to 15 of row 3 of the overhead of said first frame; and one of bytes 9 to 14 and 16 of row 4 of the overhead of said first frame. The information may therefore be provided in any available bytes of the overhead which are not being used in connection with transmission of the traffic, including byte 16 in rows 1 to 4 which are usually allocated for justification control but which are not required in this method since justification control is only required when transporting constant bit rate traffic.

In an embodiment, the control signal is arranged to cause the framer to provide said information indicative of the second transmission bit rate in a first plurality of said bytes. The first plurality of bytes are located in a second plurality of rows of the overhead. This may provide redundancy against transmission errors.

In an embodiment, the information indicative of the second transmission bit rate comprises a plurality of bits coded to indicate that the second bit rate comprises one of: a master bit rate; one half of the master bit rate; one third of the master bit rate; and one quarter of the master bit rate. In an embodiment, the information indicative of the second bit rate comprises three bits coded as one of: 001 to indicate the master bit rate; 010 to indicate one half of the master bit rate; 100 to indicate one third of the master bit rate; and 110 to indicate one quarter of the master bit rate.

In an embodiment, the client signal monitoring apparatus is arranged to monitor an indicator indicative of the client bit rate. In an embodiment, the client signal monitoring apparatus comprises an input traffic queue buffer. The client signal monitoring apparatus is arranged to monitor the rate at which the queue buffer is filled. In an embodiment, client signal monitoring apparatus is arranged to monitor when a fill level of the queue buffer reaches a threshold fill level. In an embodiment, the input traffic queue buffer comprises a first-in-first-out buffer. Providing an input traffic queue buffer may reduce latency variation within the network element because when the queue buffer is filled traffic is transmitted at a higher transmission bit rate.

In an embodiment, the client signal monitoring apparatus is arranged to monitor a client bit rate signal indicative of the client bit rate. In an embodiment, the client bit rate signal is provided by a network management system.

In an embodiment, the communications network transmission element further comprises a receiver arranged to receive a recovery signal. The recovery signal is arranged to cause the transmission apparatus to transmit a transport signal carrying traffic at a default transmission bit rate. Backward information may therefore be received from a remote transmission apparatus, for example at a further transmission element, to inform the transmission element that receiver apparatus at the remote transmission element has lost the transmitted bit rate. Transmitting traffic at a default transmission bit rate may ease regaining of transmission bit rate and frame synchronisation at the remote transmission element. In an embodiment, the recovery signal is arranged to cause the transmission apparatus to re-transmit the traffic on a transport signal at the default transmission bit rate. The risk of losing traffic for which the transmission bit rate was not available at the remote transmission element may therefore be reduced.

In an embodiment, the communications network comprises an optical transport network. The transmission bit rate is determined by an optical channel transport unit clock rate. In an embodiment, the communications network comprises a synchronous digital hierarchy network. The synchronous digital hierarchy network may be an SDH network as defined by ITU-T Recommendation G.707 and other ITU-T recommendations or a SONET network as defined by American National Standards Institute (ANSI) standards. The transmission bit rate is determined by a synchronous transport module of the network.

In an embodiment, the communications network transmission element comprises an optical packet communications network transmission element.

In an embodiment, the communications network transmission element further comprises a thermometer arranged to measure a temperature of the transmission apparatus and the transmission bit rate control apparatus is further arranged to set the divide ratio in dependence on the temperature. Reducing the transmission bit rate in dependence on the ambient temperature may reduce the power required for cooling the transmission apparatus. The transmission bit rate may therefore be throttled to control the cooling apparatus power requirements if the ambient temperature rises above a threshold value. The transmission bit rate control apparatus may implement this when the client bit rate is lower than the maximum transmission bit rate capability of the transmission apparatus. A third aspect of the invention provides a communications network element comprising an input; transport signal interrogation apparatus and local transmission apparatus. The input is arranged to receive a transport signal carrying traffic and having a transmission bit rate. The transport signal interrogation apparatus is arranged to determine whether a value for the transmission bit rate is available. The transport signal interrogation apparatus is further arranged to, if a value for the transmission bit rate is not available, generate a recovery signal arranged to cause a remote transmission apparatus to transmit a transport signal carrying traffic at a default transmission bit rate. The local transmission apparatus is arranged to transmit the recovery signal.

The network element may therefore provide backward information to a remote transmission apparatus, for example at a further network element, to inform the transmission apparatus that the network element has lost the bit rate. Causing the remote transmission apparatus to transmit traffic at a default transmission bit rate may ease regaining of transmission bit rate and frame synchronisation at the network element.

In an embodiment, the recovery signal is arranged to cause the remote transmission apparatus to re-transmit the traffic on a transport signal at the default transmission bit rate. The risk of losing traffic for which the transmission bit rate was not available at the network element may therefore be reduced.

In an embodiment, the local transmission apparatus is arranged to transmit the recovery signal is at a pre-determined recovery signal transmission bit rate. The local transmission apparatus is arranged to frame the recovery signal in a payload of a frame and to provide a recovery signal identifier in an overhead of the frame. In an embodiment, the recovery signal identifier comprises two bits coded as 10.

In an embodiment, the receiver apparatus comprises a receiver soft decision and equaliser and the transport signal monitoring apparatus is further arranged to provide the transmission bit rate to the receiver soft decision and equaliser. This may make it easier to predict threshold levels for the soft decision and equaliser.

In an embodiment, the communications network element further comprises a de-framer and a queue buffer. The de-framer is arranged to receive the transport signal and to de-frame the traffic. The queue buffer is arranged to receive and hold the de-framed traffic until a complete packet of traffic has been received and to then transmit the de-framed traffic to an output client signal interface.

A fourth aspect of the invention provides a communications network comprising a communications network transmission element as described above.

The communications network may be able to reduce the transmission bit rate in response to receiving a client signal at the transmission element having a client bit rate which is less than a maximum transmission bit rate capability of the transmission element. Reducing the transmission bit rate may reduce power consumption in the transmission element, particularly in the transmission apparatus. The power consumption of the transmission element may therefore be varied to match the received traffic load. Traffic transmission may therefore continue continuously across the network but at a lower transmission bit rate than the maximum capacity of the network or of transmission apparatus in the network.

In an embodiment, the communications network further comprises a communications network element as described above. Backward information from the network element to the transmission element may therefore by provided to inform the transmission apparatus at the transmission element that the network element has lost the bit rate. Causing the transmission apparatus at the transmission element to transmit traffic at a default transmission bit rate may ease regaining of transmission bit rate and frame synchronisation at the network element.

A fifth aspect of the invention provides a method of framing traffic for transmission in a communications network. The method comprises receiving a first client signal having a first client bit rate and comprising first traffic to be transmitted. The first client signal is to be transmitted at a first transmission bit rate. The method further comprises receiving a second client signal having a second client bit rate and comprising second traffic to be transmitted. The second client signal is to be transmitted at a second transmission bit rate. The method further comprises generating and transmitting a control signal. The control signal is arranged to cause a framer to frame a part of the first traffic in a payload of a frame. The control signal is further arranged to cause the framer to provide information indicative of the second transmission bit rate in an overhead of the frame.

Information indicative of the transmission bit rate for a subsequent frame may therefore be sent with a first frame, which may enable receiver apparatus to prepare to receive traffic at the subsequent transmission bit rate.

In an embodiment, the method further comprises monitoring an indicator indicative of said first client bit rate and monitoring an indicator indicative of said second client bit rate. The method further comprises setting the first transmission bit rate in dependence on said first client bit rate and setting the second transmission bit rate in dependence on said second client bit rate.

The transmission bit rate may therefore be reduced in response to receiving a client signal having a client bit rate which is less than a maximum transmission bit rate at which traffic can be transmitted across the network. Reducing the transmission bit rate may reduce power consumption during transmission of traffic. The method may enable power to consumption to be varied to match the received traffic load. The method may enable traffic transmission to continue continuously but at a lower transmission bit rate than the maximum for the network and may thus enable the method to be used in connection with currently installed wavelength division multiplexed network infrastructure.

In an embodiment, the frame comprises an optical transport network frame. In an embodiment, the optical transport network frame comprises an optical transport network frame as defined in ITU-T Recommendation G.709. In an embodiment, the control signal is arranged to cause the framer to provide information indicative of the second transmission bit rate in one of: byte 15 of one of rows 1 and 2 of the overhead of the first frame; one of bytes 13 to 15 of row 3 of the overhead of the first frame; and one of bytes 9 to 14 and 16 of row 4 of the overhead of the first frame. The information may therefore be provided in any available bytes of the overhead which are not being used in connection with transmission of the traffic, including byte 16 in rows 1 to 4 which are usually allocated for justification control but which are not required in this method since justification control is only required when transporting constant bit rate traffic.

In an embodiment, the control signal is arranged to cause the framer to provide said information indicative of the second transmission bit rate in a first plurality of said bytes. The first plurality of bytes are located in a second plurality of rows of the overhead. This may provide redundancy against transmission errors.

In an embodiment, the information indicative of the second transmission bit rate comprises a plurality of bits coded to indicate that the second transmission bit rate comprises one of: a master bit rate; one half of the master bit rate; one third of the master bit rate; and one quarter of the master bit rate. In an embodiment, the information indicative of the second transmission bit rate comprises three bits coded as one of: 001 to indicate the master bit rate; 010 to indicate one half of the master bit rate; 100 to indicate one third of the master bit rate; and 110 to indicate one quarter of the master bit rate.

In an embodiment, the method comprises receiving each said client signal in an input traffic queue buffer and monitoring the rate at which the queue buffer is filled. In an embodiment, the rate at which the queue buffer is filled is monitored by monitoring when a fill level of the queue buffer reaches a threshold fill level. In an embodiment, the input traffic queue buffer comprises a first-in-first-out buffer. Using an input traffic queue buffer may reduce latency variation because when the queue buffer is filled traffic is transmitted at a higher transmission bit rate.

In an embodiment, the indicator comprises a client bit rate signal indicative of the client bit rate. In an embodiment, the client bit rate signal is received from a network management system.

A sixth aspect of the invention provides a method of controlling transmission of traffic in a communications network. The method comprises receiving a transport signal carrying traffic and having a transmission bit rate. The method further comprises determining whether a value for the transmission bit rate is available. If a value for the transmission bit rate is not available, the method comprises causing a local transmitter apparatus to transmit a recovery signal. The recovery signal is arranged to cause a remote transmission apparatus to transmit traffic at a default transmission bit rate.

Backward information may therefore be sent from the local transmitter apparatus to the remote transmission apparatus to inform the remote transmission apparatus that a bit rate is not available for the transport signal. Causing the remote transmission apparatus to transmit traffic at a default transmission bit rate may ease regaining of transmission bit rate and frame synchronisation.

In an embodiment, the recovery signal is arranged to cause the remote transmission apparatus to re-transmit the traffic on a transport signal at the default transmission bit rate. The risk of losing traffic for which the transmission bit rate was not available may therefore be reduced.

In an embodiment, the method further comprises transmitting the recovery signal at a pre-determined recovery signal transmission bit rate. The method comprises framing the recovery signal in a payload of a frame and providing a recovery signal identifier in an overhead of the frame. In an embodiment, the recovery signal identifier comprises two bits coded as 10.

In an embodiment, the communications network is one of comprises an optical transport network and a synchronous digital hierarchy network. The transmission bit rate is determined by one of an optical channel transport unit clock rate, an optical channel data unit clock rate and an optical channel payload unit clock rate. In an embodiment, the communications network comprises a synchronous digital hierarchy network. The transmission bit rate is determined by a synchronous transport module of the network. A seventh aspect of the invention provides a data carrier having computer readable instructions embodied therein. The said computer readable instructions are for providing access to resources available on a processor. The computer readable instructions comprise instructions to cause the processor to perform any of the above steps of the method of transmitting traffic in a communications network.

An eighth aspect of the invention provides a data carrier having computer readable instructions embodied therein. The said computer readable instructions are for providing access to resources available on a processor. The computer readable instructions comprise instructions to cause the processor to perform any of the above steps of the method of framing traffic for transmission in a communications network.

A ninth aspect of the invention provides a data carrier having computer readable instructions embodied therein. The said computer readable instructions are for providing access to resources available on a processor. The computer readable instructions comprise instructions to cause the processor to perform any of the above steps of the method of controlling transmission of traffic in a communications network.

DETAILED DESCRIPTION

Figure 1:
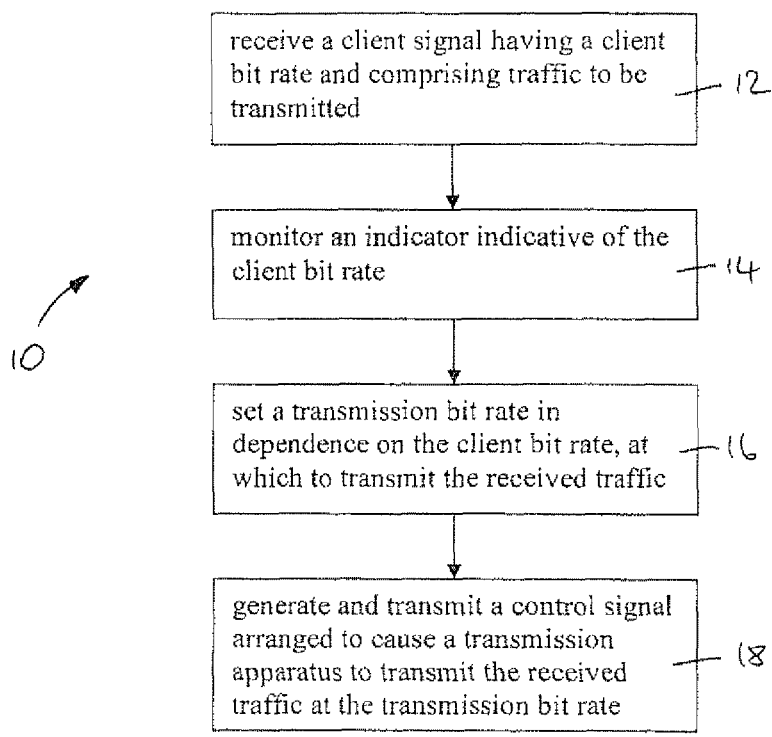
FIG. 1 shows the steps of a method of transmitting traffic in a communications network according to a first embodiment of the invention.

FIG. 1 shows the steps of a method 10 of transmitting traffic in a communications network according to a first embodiment of the invention.

The method 10 comprises receiving a client signal having a client bit rate and comprising traffic to be transmitted 12 and monitoring an indicator indicative of the client bit rate 14. The method 10 further comprises setting a transmission bit rate at which to transmit the traffic 16. The transmission bit rate is set in dependence on the client bit rate. A control signal arranged to cause a transmission apparatus to transmit the traffic at the transmission bit rate is generated and transmitted 18.

The method may be applied to any type of communications network, including an optical transport network (OTN) and a synchronous digital hierarchy (SDH) network.

The client signal may comprise one signal carrying traffic to be transmitted or it may comprise an aggregate of a plurality of signals, each carrying traffic to be transmitted. The client bit rate may therefore comprise the bit rate of a single signal or it may comprise the gross bit rate of a plurality of aggregated signals.

The transmission bit rate refers to the rate at which the transmission apparatus transmits a single stream of traffic. The control signal therefore controls the actual rate at which the transmission apparatus transmits traffic and not an effective transmission bit rate such as can be achieved in time division multiplexed (TDM) transmission in which multiple streams of traffic are transmitted in different time slots. An effective transmission bit rate for a traffic stream can be achieved in TDM transmission which is different to the rate at which traffic is transmitted within each time slot, i.e. the rate at which the transmission apparatus transmits data, the effective transmission bit rate being dependent upon the number and allocation of time slots in which a stream of traffic is transmitted.

The method may enable the transmission bit rate to be reduced in response to receiving a client signal having a client bit rate which is less than a maximum transmission bit rate at which traffic can be transmitted across the network. Reducing the transmission bit rate at which the transmission apparatus transmits the traffic may reduce the power consumption of the transmission apparatus during transmission of traffic. The power consumption of the transmission apparatus may therefore be varied to match the received traffic load. The method may enable traffic transmission to continue continuously but at a lower transmission bit rate than the maximum for the network or the capability of the transmission apparatus and may thus enable the method to be used in connection with currently installed wavelength division multiplexed network infrastructure.

Figure 2:
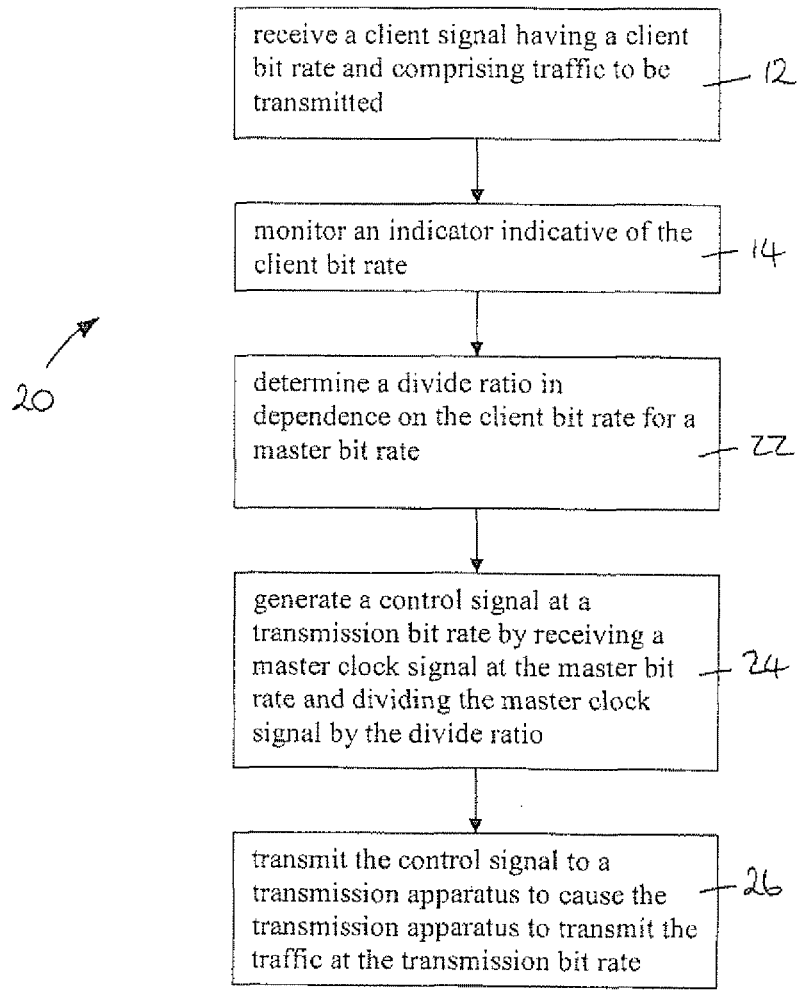
FIG. 2 shows the steps of a method of transmitting traffic in a communications network according to a second embodiment of the invention.

The steps of a method 20 of transmitting traffic in a communications network according to a second embodiment of the invention are shown in FIG. 2. The method 20 is similar to the method 10 of FIG. 1, with the following modifications. The same reference numbers are retained for corresponding steps.

In this embodiment, the transmission bit rate is set by determining a divide ratio for a master bit rate in dependence on the client bit rate 22. The control signal comprises a clock signal generated by receiving a master clock signal at the master bit rate and dividing the master clock signal by the divide ratio 24. The control signal is then transmitted to a transmission apparatus to cause the transmission apparatus to transmit the traffic at the transmission bit rate which has been set 26.

This may provide a simple mechanism for setting the transmission bit rate and generating the control signal. The transmission bit rate is varied by varying the divide ratio while the master clock signal has a constant master bit rate. This may ease clock recovery at a receiver which can run at a constant bit rate locked to an incoming signal.

Figure 3:
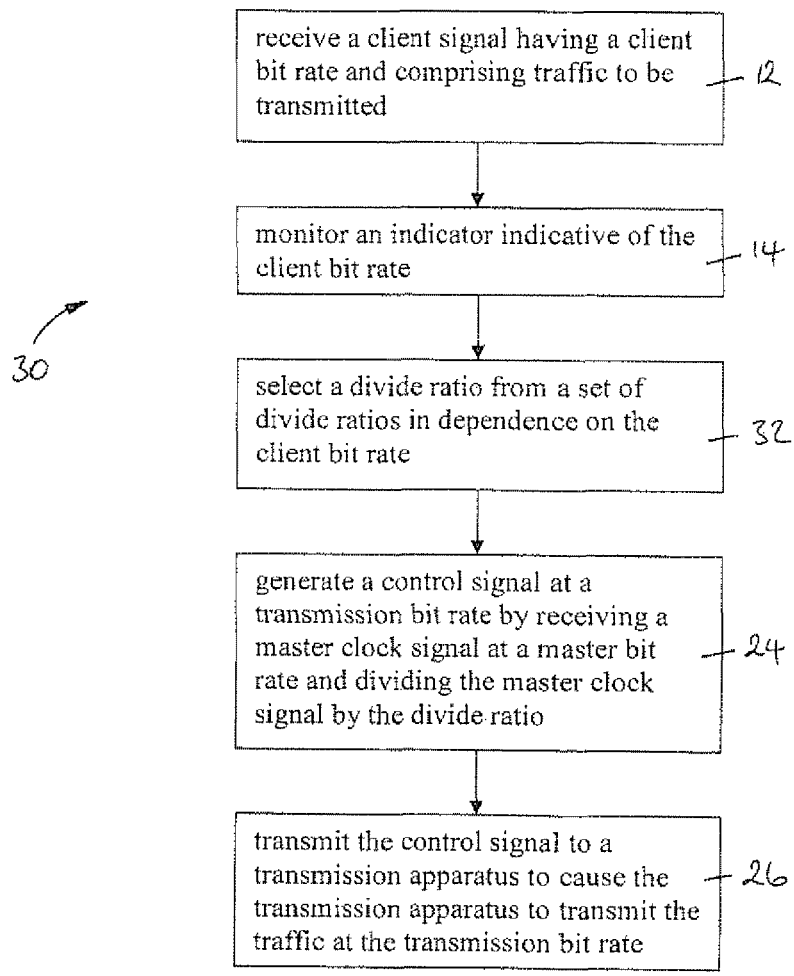
FIG. 3 shows the steps of a method of transmitting traffic in a communications network according to a third embodiment of the invention.

The steps of a method 30 of transmitting traffic in a communications network according to a third embodiment of the invention are shown in FIG. 3. The method 30 is similar to the method 20 of FIG. 2, with the following modifications. The same reference numbers are retained for corresponding steps.

In this embodiment, the transmission bit rate is set by selecting a divide ratio from a set of divide ratios in dependence on the client bit rate 32. This may further simplify operation of the method as it is only necessary to select an appropriate one of a set of divide ratios rather than determining a divide ratio.

In a fourth embodiment, the step of selecting a divide ratio further comprises selecting a plurality of divide ratios from the set of divide ratios. An intermediate transmission bit rate may then set by periodically switching between each of the selected divide ratios. The intermediate transmission bit rate is an average of the transmission bit rates at the selected divide ratios.

Figure 4:
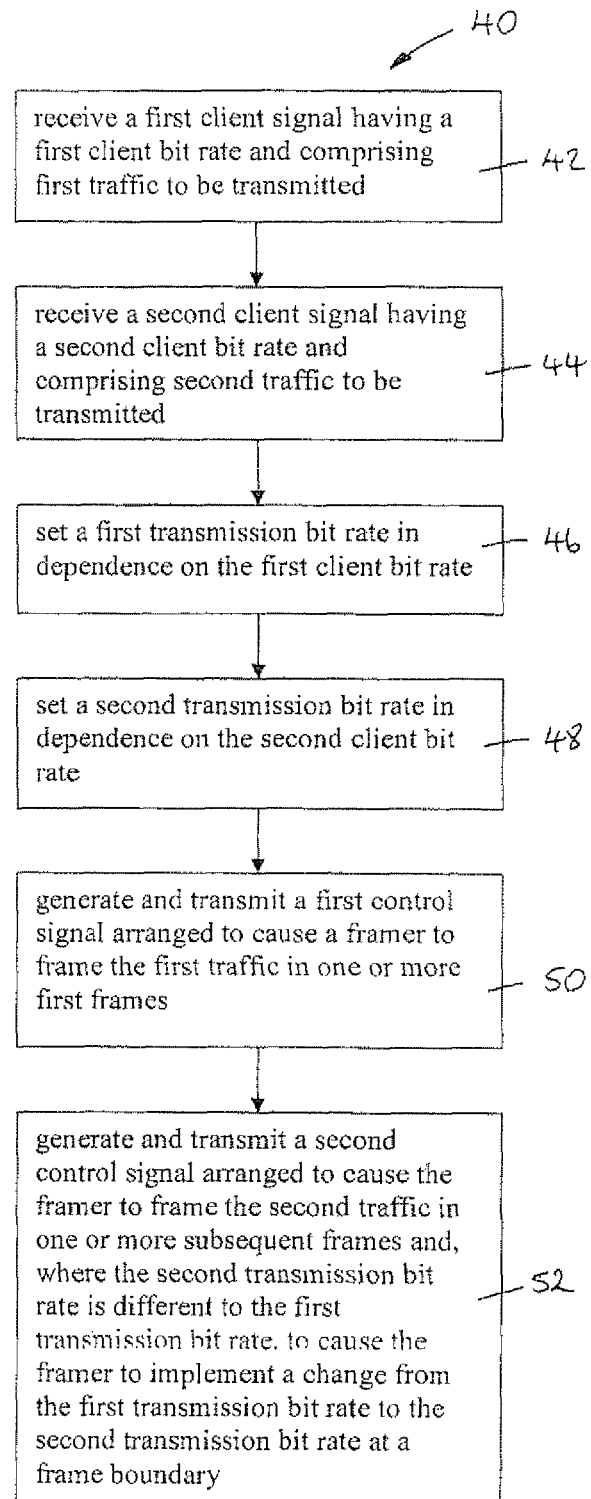
FIG. 4 shows the steps of a method of transmitting traffic in a communications network according to a fifth embodiment of the invention.

The steps of a method 40 of transmitting traffic in a communications network according to a fifth embodiment of the invention are shown in FIG. 4.

The method 40 comprises receiving a first client signal having a first client bit rate and comprising first traffic to be transmitted 42 and subsequently receiving a second client signal having a second client bit rate and comprising second traffic to be transmitted 44. A first transmission bit rate is set in dependence on the first client bit rate 46 and a second transmission bit rate is set in dependence on the second client bit rate 48. A first control signal is generated and transmitted which is arranged to cause a framer to frame the first traffic into one or more first frames at the first transmission bit rate 50. A second control signal is generated and transmitted which is arranged to cause the framer to frame the second traffic into one or more subsequent frames at the second transmission bit rate 52. Where the second transmission bit rate is different to the first transmission bit rate, the second control signal is further arranged to cause the framer to implement the change from the first transmission bit rate to the second transmission bit rate at a frame boundary. Changing the transmission bit rate only at a frame boundary may ensure that a clean change over is achieved from the first transmission bit rate to the second transmission bit rate and may prevent spillage of traffic from a first frame into a subsequent frame.

Figure 5:
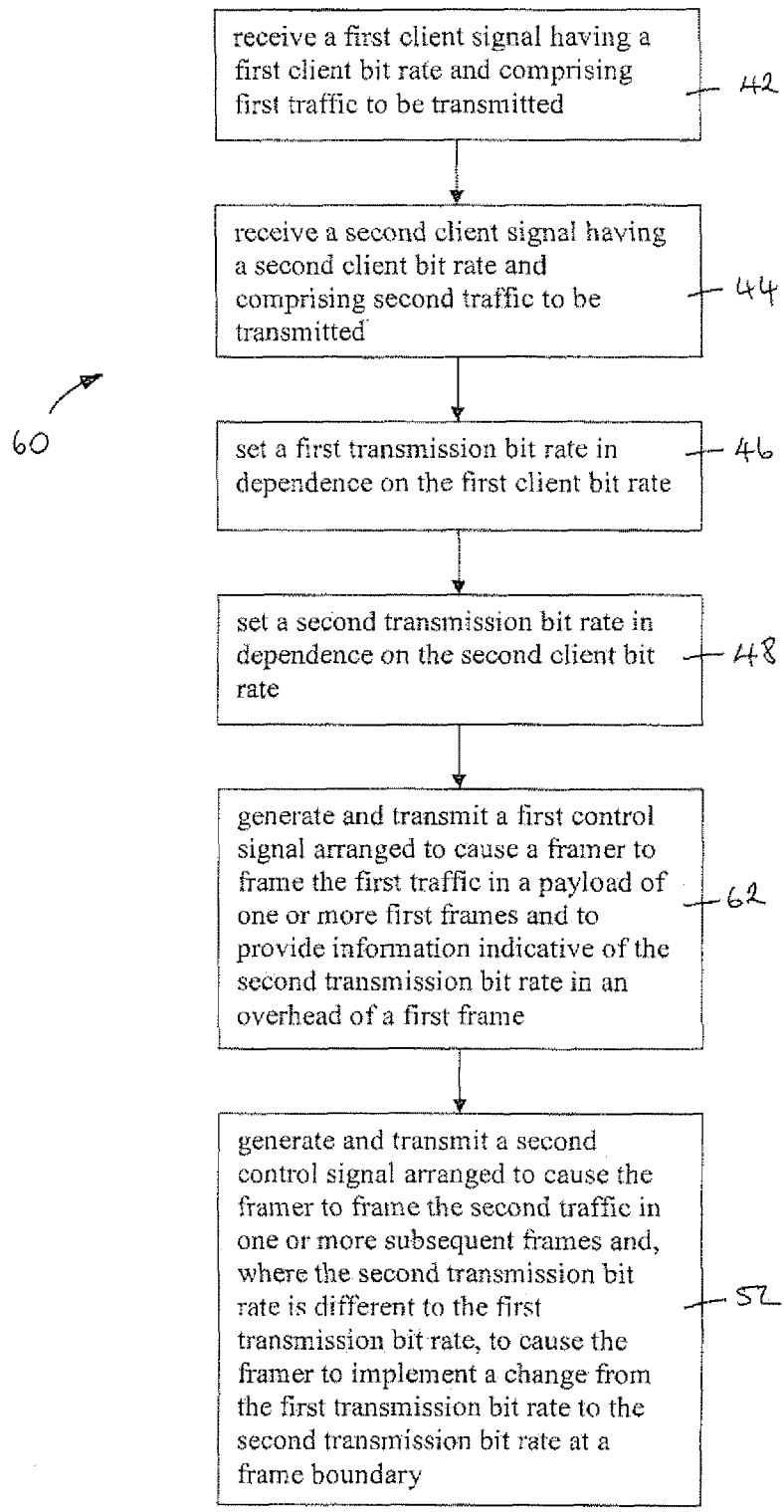
FIG. 5 shows the steps of a method of transmitting traffic in a communications network according to a sixth embodiment of the invention.

FIG. 5 shows the steps of a method 60 of transmitting traffic in a communications network according to a sixth embodiment of the invention. The method 40 of this embodiment is similar to the method 40 of the previous embodiment, with the following modifications. The same reference numbers are retained for corresponding steps.

In this embodiment, the first control signal is arranged to cause the framer to frame the first traffic in a payload of one or more first frames 62. The first control signal is additionally arranged to cause the framer to provide information indicative of the second transmission bit rate in an overhead of a first frame 62. This may enable a receiver receiving the traffic to track changes in the transmission bit rate and to prepare to receive traffic at a different transmission bit rate.

Figure 6:
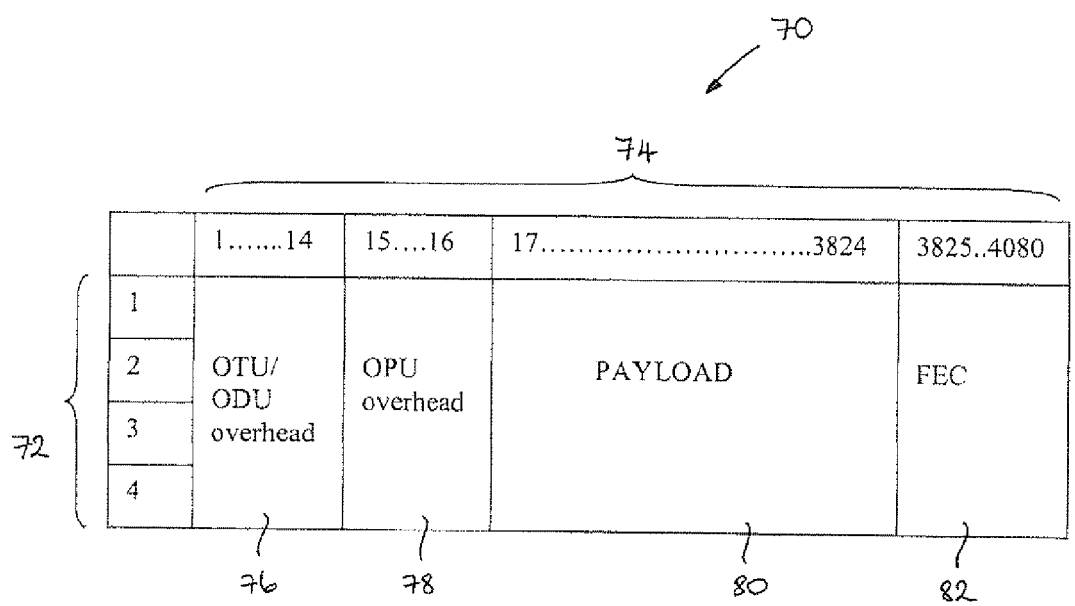
FIG. 6 is a representation of an optical transport network frame.

In a seventh embodiment of the invention the frames into which the traffic is framed are optical transport network (OTN) frames. A schematic representation of an OTN frame which meets the requirements of ITU-T Recommendation G.709 is shown in FIG. 6.

The OTN frame 70 comprises four rows 72 each of which comprise 4080 bytes (columns) 74. Bytes 1 to 14 of each row comprise the optical channel transport unit (OTU) overhead and the optical channel data unit (ODU) overhead 76. Bytes 15 and 16 of each row comprise the optical channel payload unit (OPU) overhead 78. The payload 80 of the frame 70 comprises bytes 17 to 3824 of each row and forward error correction (FEC) information 82 is allocated to bytes 3825 to 4080 of each row.

In this example, the information indicative of the second transmission bit rate may be provided in any available bytes of the overhead which are not being used in connection with transmission of the traffic. In particular, this information may be provided in one of: byte 15 of one of rows 1 and 2; one of bytes 13 to 15 of row 3; and one of bytes 9 to 14 and 16 of row 4.

Redundancy against transmission errors may be provided by using bytes in two or more of the rows 72 of the overhead 76, 78.

The information indicative of the second transmission bit rate comprises a plurality of bits coded to indicate that the second bit rate comprises one of: a master bit rate; one half of the master bit rate; one third of the master bit rate; and one quarter of the master bit rate.

In this example, 001 is used to indicate the master bit rate; 010 to indicate one half of the master bit rate; 100 to indicate one third of the master bit rate; and 110 to indicate one quarter of the master bit rate.

Figure 7:
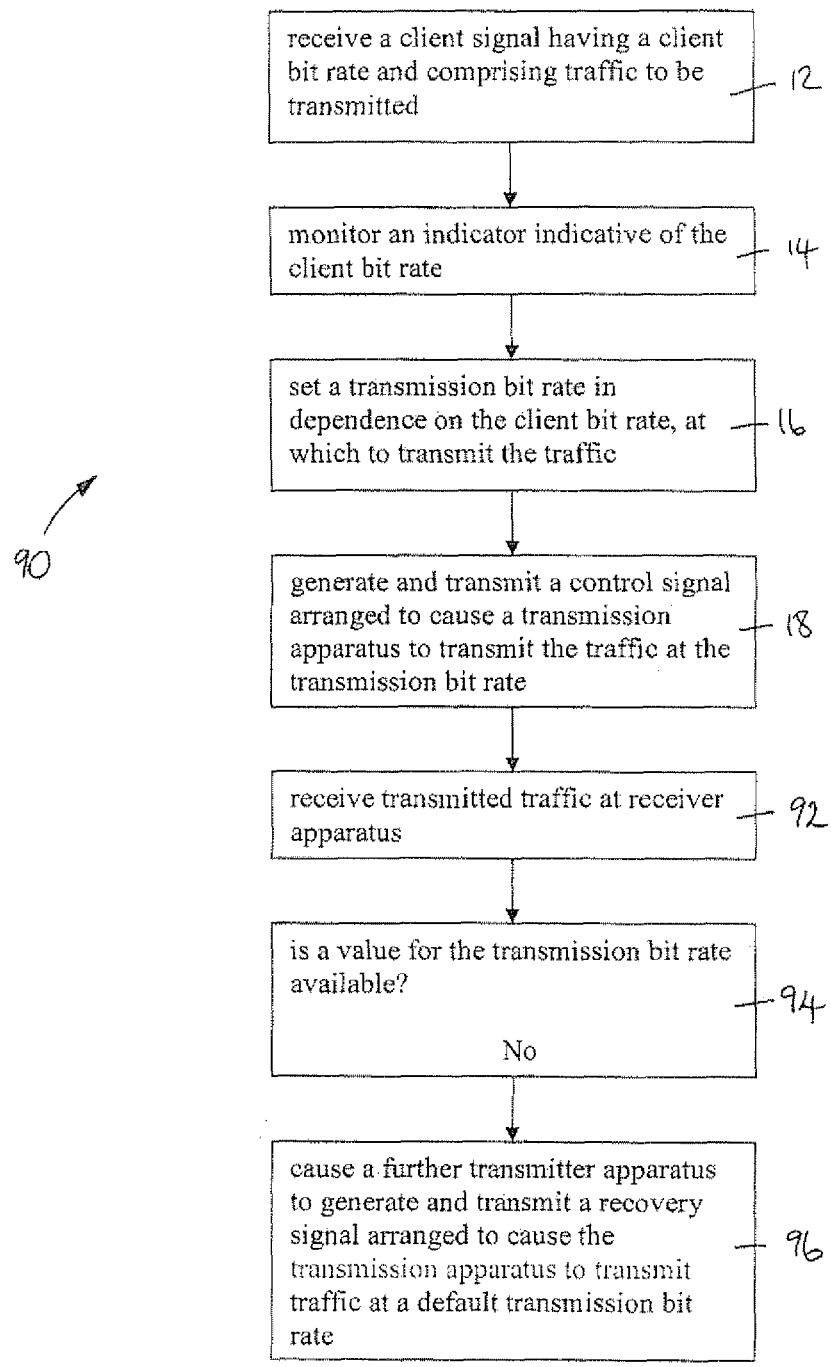
FIG. 7 shows the steps of a method of transmitting traffic in a communications network according to an eighth embodiment of the invention.

FIG. 7 shows the steps of a method 90 of transmitting traffic in a communications network according to an eighth embodiment of the invention. The method 90 of this embodiment is similar to the method 10 of FIG. 1, with the following modifications. The same reference numbers are retained for corresponding steps.

In this embodiment, the method 90 further comprises receiving transmitted traffic at receiver apparatus 92 and determining whether a value for the transmission bit rate is available 94. If a value for the transmission bit rate is not available, the method further comprises causing a further transmission apparatus to generate and transmit a recovery signal 96. The recovery signal is arranged to cause the transmission apparatus to transmit traffic at a default transmission bit rate. Backward information may therefore be sent from the receiver apparatus to the transmission apparatus to inform the transmission apparatus that the receiver apparatus has lost the bit rate. Transmitting traffic at a default transmission bit rate may ease regaining of transmission bit rate and frame synchronisation at the receiver apparatus.

A ninth embodiment of the invention provides a method of transmitting traffic in a communications network having the same method steps as the previous embodiment, with the following modification. In this embodiment, the recovery signal is arranged to cause the remote transmission apparatus to re-transmit the traffic on a transport signal at the default transmission bit rate. The traffic for which a bit rate was not available is therefore re-transmitted and the risk of losing the traffic may therefore be reduced.

Figure 8:
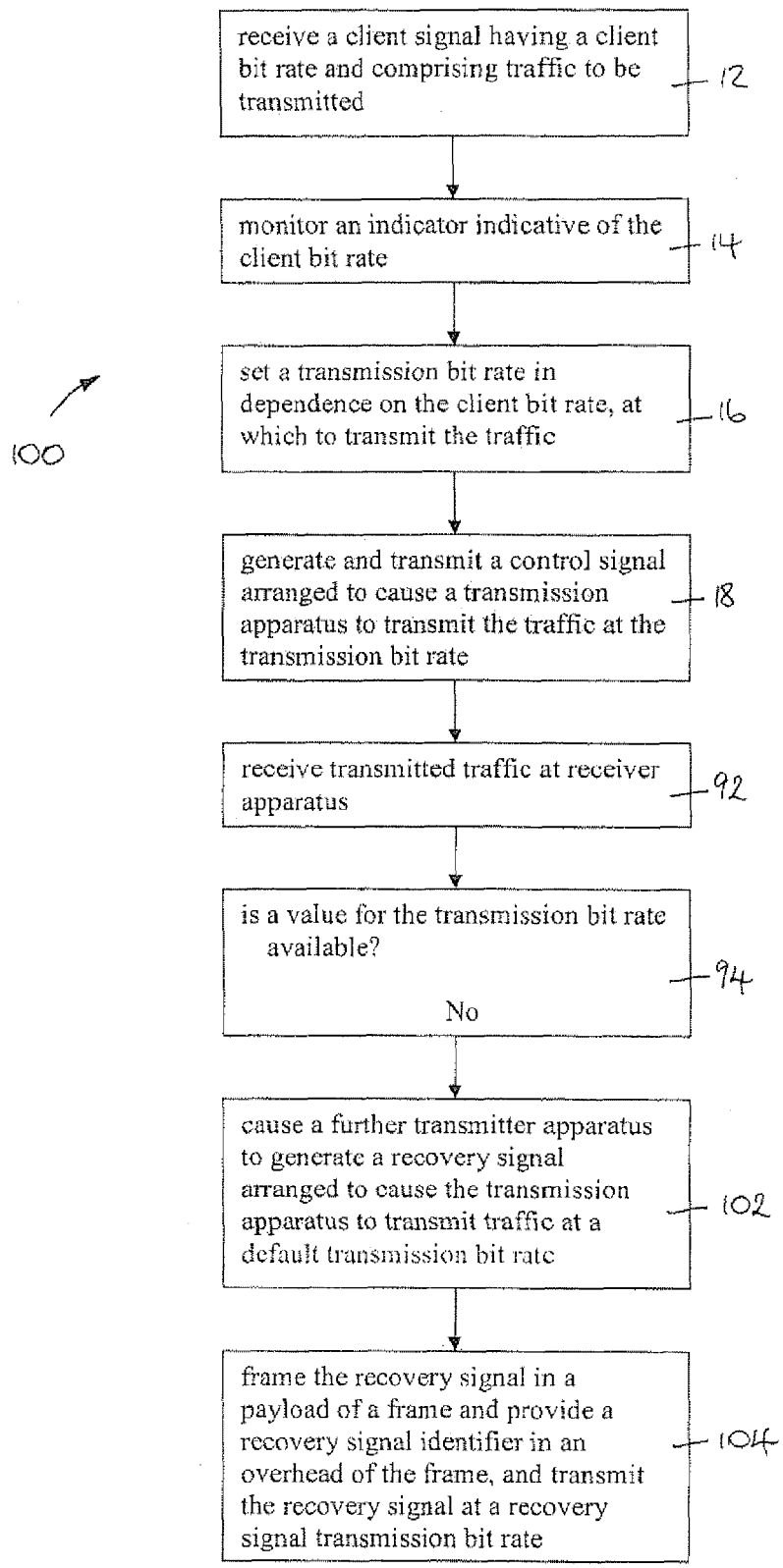
FIG. 8 shows the steps of a method of transmitting traffic in a communications network according to a tenth embodiment of the invention.

The steps of a method 100 of transmitting traffic in a communications network according to a tenth embodiment of the invention are shown in FIG. 8. The method 100 of this embodiment is similar to the method 90 of FIG. 7, with the following modifications. The same reference numbers are retained for corresponding steps.

In this embodiment, the further transmission apparatus is arranged to generate a recovery signal arranged to cause the transmission apparatus to transmit traffic at a default transmission bit rate 102. The recovery signal is framed in a payload of a frame and a recovery signal identifier is provided in an overhead of the frame 104. The recovery signal is transmitted at a pre-determined recovery signal transmission bit rate 104. An eleventh embodiment of the invention provides a method of transmitting traffic in a communications network which is similar to the method 100 of the previous embodiment. The method of this embodiment comprises the same steps as the method 100, with the recovery signal identifier comprising two bits coded as 10 which are provided in the overhead of the frame 104.

Figure 9:
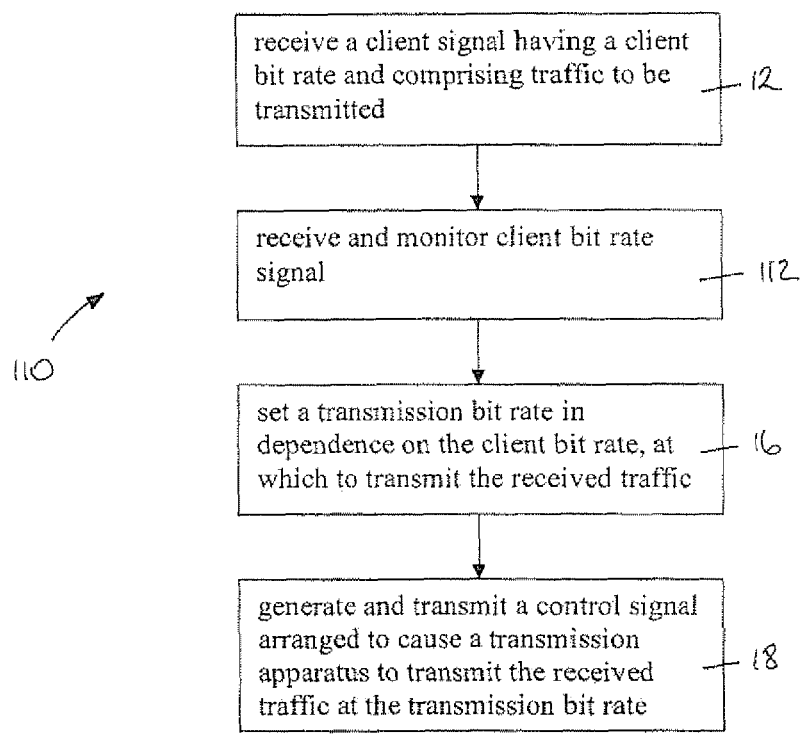
FIG. 9 shows the steps of a method of transmitting traffic in a communications network according to a twelfth embodiment of the invention.

FIG. 9 shows the steps of a method 110 of transmitting traffic in a communications network according to a twelfth embodiment of the invention. The method 110 of this embodiment is similar to the method 10 of FIG. 1, with the following modifications. The same reference numbers are retained for corresponding steps.

The indicator indicative of the client bit rate comprises a client bit rate signal. The method of this embodiment comprises receiving a client bit rate signal indicative of the client bit rate from a network management system.

Figure 10:
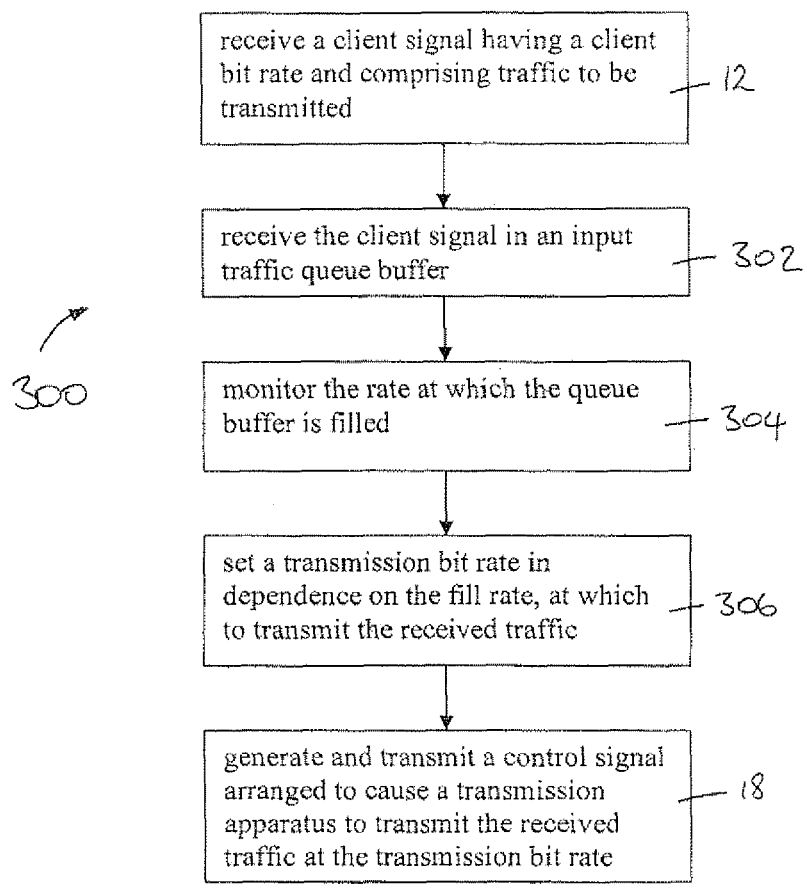
FIG. 10 shows the steps of a method of transmitting traffic in a communications network according to a thirteenth embodiment of the invention.

FIG. 10 shows the steps of a method 300 of transmitting traffic in a communications network according to a thirteenth embodiment of the invention. The method 300 of this embodiment is similar to the method 10 of FIG. 1, with the following modifications. The same reference numbers are retained for corresponding steps.

In this embodiment, the client bit rate is determined by receiving the client signal in an input traffic queue buffer 302 and monitoring the rate at which the buffer is filled 304.

The transmission bit rate is set in dependence on the fill rate 306.

Using an input traffic queue buffer may reduce latency variation because when the queue is filled traffic is transmitted at a higher transmission bit rate.

A fourteenth embodiment of the invention provides a method of transmitting traffic in a communications network which is similar to the method 300 of FIG. 10.

In this embodiment, the rate at which the queue buffer is filled is monitored by monitoring when the fill level of the queue buffer reaches a threshold value.

A fifteenth embodiment of the invention provides a method of transmitting traffic in a communications network which is similar to the method 20 of FIG. 2. The method of this embodiment comprises the same steps as the method 20, with the step of determining a divide ratio further comprising obtaining a temperature of the transmission apparatus and the divide ratio is set in dependence on the temperature. Reducing the transmission bit rate in dependence on the ambient temperature may reduce the power required for cooling the transmission apparatus. The method may therefore be used to throttle the transmission bit rate if the ambient temperature rises above a threshold value.

Figure 11:
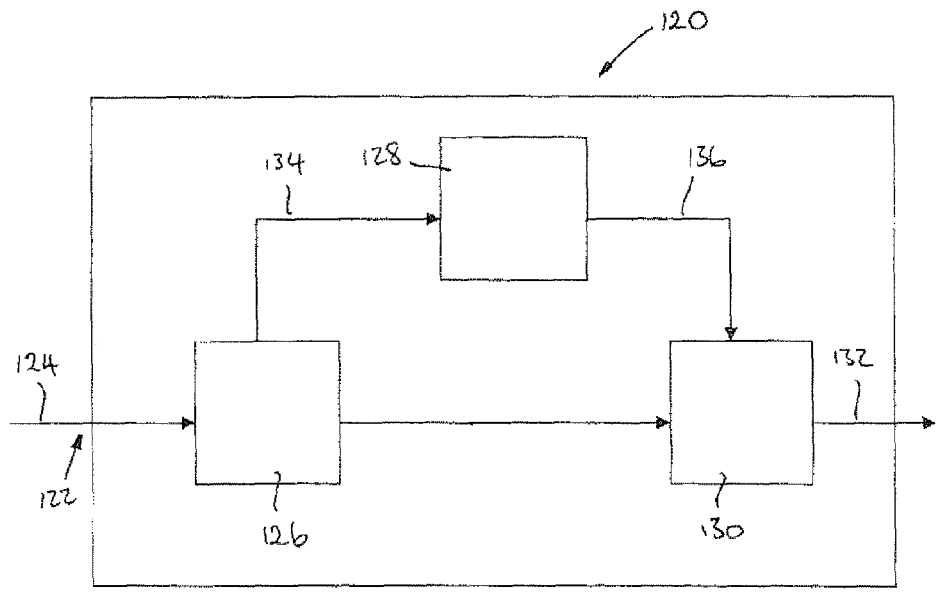
FIG. 11 is a schematic representation of a communications network transmission element according to a fifteenth embodiment of the invention.

Referring to FIG. 11, a sixteenth embodiment of the invention provides a communications network transmission element 120. The communications network transmission element 120 comprises an input 122, client signal monitoring apparatus 126, transmission bit rate control apparatus 128 and transmission apparatus 130.

The input 122 is arranged to receive a client signal 124 having a client bit rate and comprising traffic to be transmitted. The client signal monitoring apparatus 126 is arranged to monitor an indicator indicative of the client bit rate and to transmit a client bit rate signal 134 to the transmission bit rate control apparatus. The transmission bit rate control apparatus 128 is arranged to set a transmission bit rate at which to transmit the received traffic. The transmission bit rate is set in dependence on the client bit rate as indicated by the client bit rate signal 134. The transmission bit rate control apparatus is further arranged to generate and transmit a control signal 136 arranged to cause the transmission apparatus 130 to transmit the traffic at the transmission bit rate. The transmission apparatus 130 is arranged to receive the control signal 136 and to generate and transmit a transport signal 132 carrying the traffic.

The transmission element 120 may be able to reduce the transmission bit rate in response to receiving a client signal having a client bit rate which is less than a maximum transmission bit rate capability of the transmission element. In this way the power consumption of the transmission apparatus may be reduced and may be varied to Match the received traffic load. The transmission element 120 is able to transmit traffic continuously but at a lower transmission bit rate than its maximum capability. The transmission element 120 may therefore be used within currently installed WDM network infrastructure.

Figure 12:
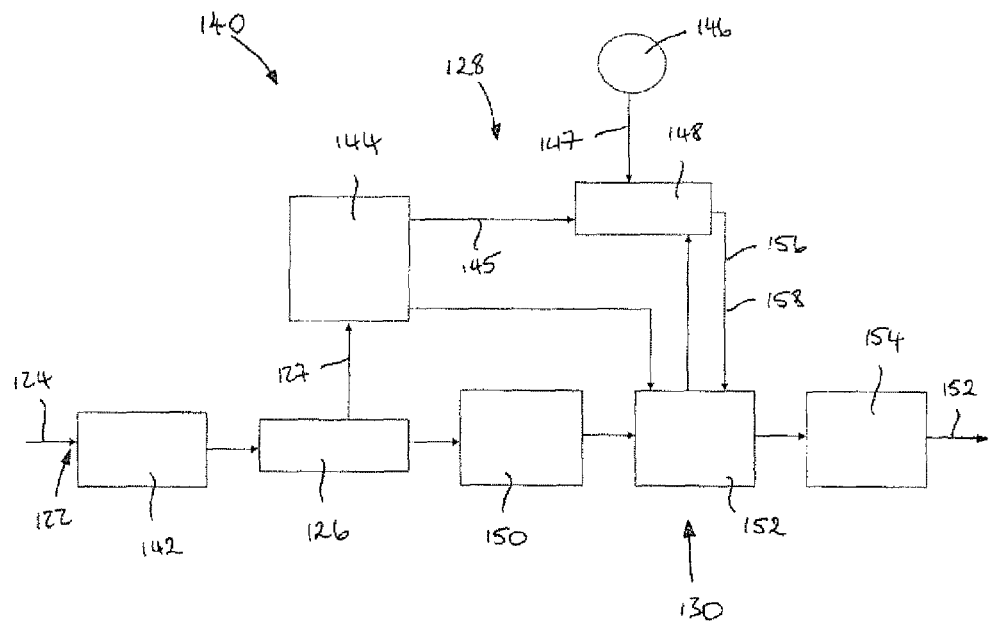
FIG. 12 is a schematic representation of a communications network transmission element according to a sixteenth embodiment of the invention.

A seventeenth embodiment of the invention provides a communications network transmission element 140, as shown in FIG. 12. The transmission element 140 is similar to the transmission element 120 of FIG. 10, with the following modifications. The same reference numbers are retained for corresponding features.

In this embodiment, the transmission element 140 comprises a source termination of an optical transport network (OTN), as defined by ITU-T Recommendation G.709.

The source termination 140 comprises a client signal interface 142 arranged to receive a client signal having a client bit rate and comprising traffic for transmission. The client signal interrogation apparatus 126 comprises a queue buffer, which in this example takes the form of a first-in-first-out (FIFO) buffer which is arranged to receive the client signal from the client signal interface 142. As the client signal is received at the FIFO buffer 126 the fill level of the buffer is monitored and when the fill level reaches a threshold value a fill level signal 127 that the threshold value has been reached is transmitted to the transmission bit rate control apparatus 128.

In this example, the transmission bit rate control apparatus 128 comprises a controller 144, a clock 146 and a divider 148. The controller 144 is arranged to receive the fill level signal 127 and to determine a divide ratio in dependence on the fill level. The clock 146 is arranged to generate a master clock signal 147 having a master bit rate. The divider 148 is arranged to receive a divide ratio signal 145 from the controller 144 and to divide the master clock signal 147 at the divide ratio to form a control signal 156.

The transmission apparatus 130 comprises an adaption layer 150, for example generic framing procedure (GFP), a framer 152 and a modulator 154. The adaption layer 150 is arranged to receive traffic for transmission from the FIFO buffer 126 and to prepare the traffic for framing by the framer 152, including removing jitter and adding data to be provided in the overhead of the frame.

The transmission bit rate is varied by varying the divide ratio, in dependence on the fill level, whilst the master clock signal 147 has a constant master bit rate.

In this example, the divide ratio is selected from a set of divide ratios provided within the controller 144, the divide ratio being selected from the set in dependence on the fill level.

Figure 13:
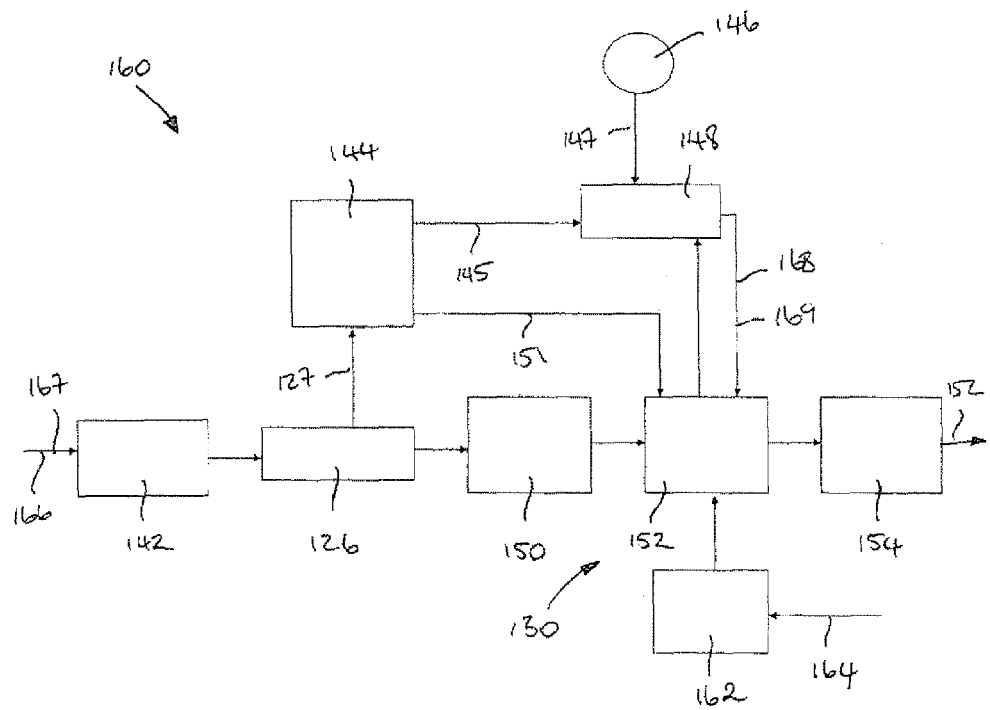
FIG. 13 is a schematic representation of a communications network transmission element according to an eighteenth embodiment of the invention.

An eighteenth embodiment of the invention provides a communications network transmission element 160, as shown in FIG. 13. The transmission element 160 of this embodiment again comprises a source termination of an OTN and is similar to the source termination 140 of FIG. 12, with the following modifications. The same reference numbers are retained for corresponding features.

In this embodiment, the source termination 160 is arranged to receive a first client signal 166 having a first client bit rate and comprising first traffic to be transmitted and to subsequently receive a second client signal 167 having a second client bit rate and comprising second to be transmitted. The controller 144 is arranged to set a first transmission bit rate in dependence on the first client bit rate at which to transmit the first traffic. This is done by the controller 144 determining a divide ratio in dependence on the fill level signal 127 received from the FIFO buffer 126 for the first client signal. The controller 144 is similarly arranged to determine a divide ratio for the second client signal 167, to set a second transmission bit rate at which to transmit the second traffic. The clock signal 147 is divided by the first divide ratio to provide a first control signal 168 arranged to cause the framer 152 to frame the first traffic into one or more first frames at the first transmission bit rate. The clock signal 147 is subsequently divided by the second divide ratio to generate a second control signal 169 arranged to cause the framer to frame the second traffic into one or more subsequent frames at the second transmission bit rate.

Where the second transmission bit rate is different to the first transmission bit rate, the second control signal 169 is further arranged to cause the framer 152 to implement a change from the first transmission bit rate to the second transmission bit rate at a frame boundary. Causing the bit rate to change only at a frame boundary may ensure that a clean change over is achieved from the first transmission bit rate to the second transmission bit rate and may prevent spillage of traffic from a first frame into a subsequent frame.

The controller 144 may be further arranged to generate and transmit a bit rate code signal 151 indicative of the first transmission bit rate and the second transmission bit rate, which is transmitted to the framer 152.

The first control signal 168 is arranged to cause the framer 152 to frame the first traffic in a payload of one or more first frames. The first control signal is further arranged to cause the framer 152 to provide information indicative of the second transmission bit rate in an overhead of at least one first frame.

The source termination 160 further comprises a receiver 162 arranged to receive a recovery signal 164. The recovery signal is arranged to cause the transmission apparatus 130 to transmit a transport signal carrying traffic at a default transmission bit rate. The recovery signal causes the framer 152 to frame the traffic at the default transmission bit rate.

The source termination 160 is therefore able to receive backward information from a remote transmission apparatus to which the traffic carrying signal 152 has been transmitted, to inform the source termination 160 that the remote transmission apparatus has lost the bit rate.

In a nineteenth embodiment, the source termination 160 may further comprise a thermometer arranged to measure a temperature of the source termination 160, which may be the ambient temperature. The controller 144 is arranged to receive a temperature signal from the thermometer indicative of the ambient temperature and the controller 144 is further arranged to set the divide ratio in dependence on the temperature. The transmission bit rate can therefore be reduced in dependence on the ambient temperature where the temperature exceeds a threshold value, and this is desirable to reduce the amount of cooling required for the source termination. This may be done when the client bit rate is lower than the maximum transmission bit rate capability of the transmission apparatus.

Figure 14:
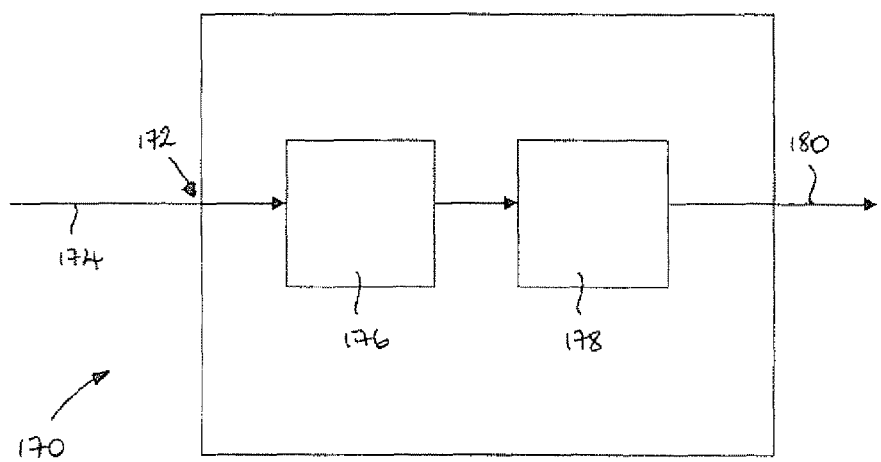
FIG. 14 is a schematic representation of a communications network element according to a twentieth embodiment of the invention.

A twentieth embodiment of the invention provides a communications network element 170, as shown in FIG. 14.

The communications network element 170 comprises an input 172, transport signal interrogation apparatus 176 and local transmission apparatus 178. The input 172 is arranged to receive a transport signal 174 carrying traffic having a transmission bit rate. The transport signal interrogation apparatus 176 is arranged to determine whether a value for the transmission bit rate is available. If a value is not available for the transmission bit rate, the transport signal interrogation apparatus is further arranged to generate a recovery signal 180 arranged to cause a remote transmission apparatus to transmit a transport signal carrying traffic at a default transmission bit rate. The local transmission apparatus 178 is arranged to transmit the recovery signal 180.

The communications network element 170 may therefore provide backward information to a remote transmission apparatus, for example at a further network element, to inform the transmission apparatus that the network element has lost the bit rate. Causing the remote transmission apparatus to transmit, or re-transmit, the traffic at a default transmission bit rate may ease regaining of transmission bit rate and frame synchronization at the network element 170.

Figure 15:
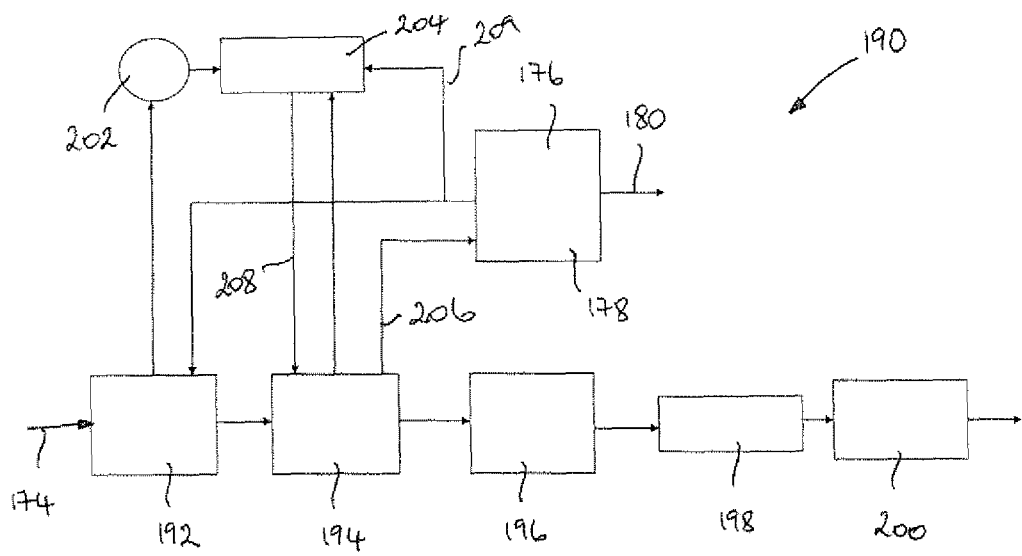
FIG. 15 is a schematic representation of a communications network element according to a twenty-first embodiment of the invention.

FIG. 15 shows a communications network element 190 according to a twenty-first embodiment of the invention. The communications network element 190 is similar to the network element 170 of FIG. 14, with the following modifications. The same reference numbers are retained for corresponding features.

The communications network element 190 of this embodiment comprises a sink termination of an OTN, as defined by ITU-T Recommendation G.709.

The sink termination 190 comprises a receiver soft decision equalizer 192 arranged to receive the transport signal 174. The receiver 192 is arranged to convert the received optical signal into an electrical signal to transmit that to a deframer 194. The deframer 194 is arranged to deframe the traffic and to transmit it to an adaption layer 196 arranged to remove the overhead and to transmit the traffic to a queue buffer 198. The queue buffer 198 is arranged to receive and hold the deframed traffic until a complete packet of traffic has been received, following which the traffic is transmitted to an output client signal interface arranged to convert the traffic into an output client signal for onwards transmission or processing.

The deframer 194 is arranged to retrieve information from the frame overhead relating to the transmission bit rate for a subsequent frame and to transmit a bit rate code signal 206 to the transport signal interrogation apparatus 176, which is arranged to store the transmission bit rate for future reference.

On receipt of a transport signal carrying traffic 124, the transport signal interrogation apparatus 176 is arranged to determine whether a value for the transmission bit rate for the signal is available. If the transmission bit rate has not been received previously or has been lost, the transport signal interrogation apparatus 176 is arranged to generate a recovery signal 180, as described above.

In this example, the transport signal interrogation apparatus 176 is further arranged to determine a divide ratio for generating a control signal 208 for the deframer 194. The divide ratio is set according to the bit rate and a divide ratio control signal 209 is transmitted to a divider 204. The control signal 208 for the deframer is generated by dividing a clock signal generated by a master clock 202 by the divide ratio.

Figure 16:
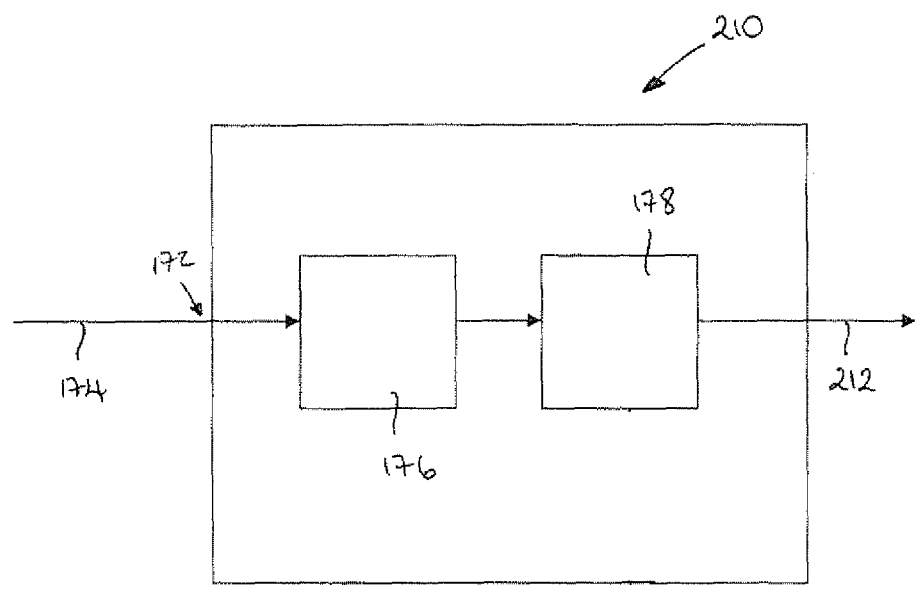
FIG. 16 is a schematic representation of a communications network element according to a twenty-second embodiment of the invention.

A communications network element 210 according to a twenty-second embodiment of the invention is shown in FIG. 16. The network element 210 of this embodiment is similar to the network element 170 of FIG. 13, with the following modifications. The same reference numbers are retained for corresponding features.

In this embodiment, the local transmission apparatus 178 is arranged transmit the recovery signal 212 at a predetermined recovery signal transmission bit rate. The local transmission apparatus 178 is arranged to frame the recovery signal in a payload of a frame and to provide a recovery signal identifier in an overhead of the frame. The recovery signal identifier comprises two bits coded as 10.

Figure 17:
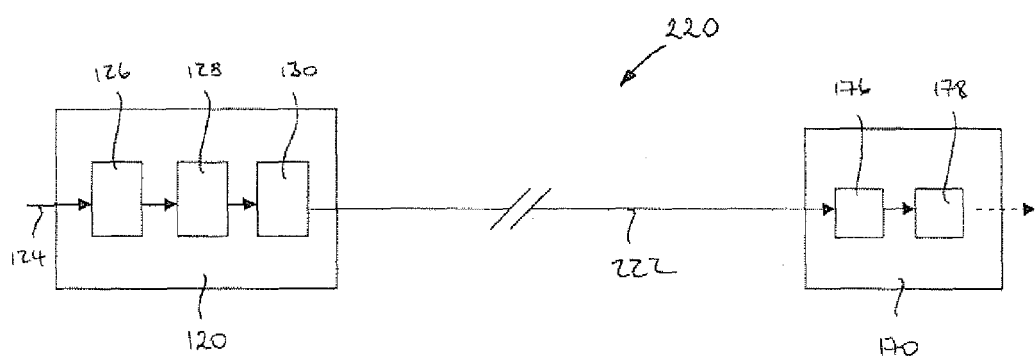
FIG. 17 is a schematic representation of a communications network according to a twenty-third embodiment of the invention.

A twenty-third embodiment of the invention provides a communications network 220 as shown in FIG. 17.

The communications network 220 comprises a communications network transmission element 120 as shown in FIG. 11, a transport link 222 and a communications network element 170 as shown in FIG. 14.

Figure 18:
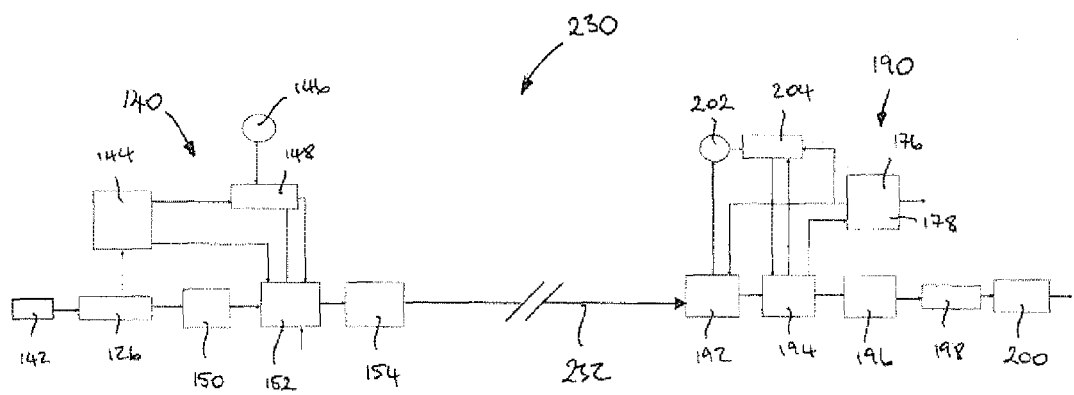
FIG. 18 is a schematic representation of a communications network according to a twenty-fourth embodiment of the invention.

FIG. 18 shows a communications network 230 according to a twenty-fourth embodiment of the invention.

The communications network 230 comprises a source termination 140 as shown in FIG. 12, a transport link 232 and a sink termination 190 as shown in FIG. 15.

Figure 19:
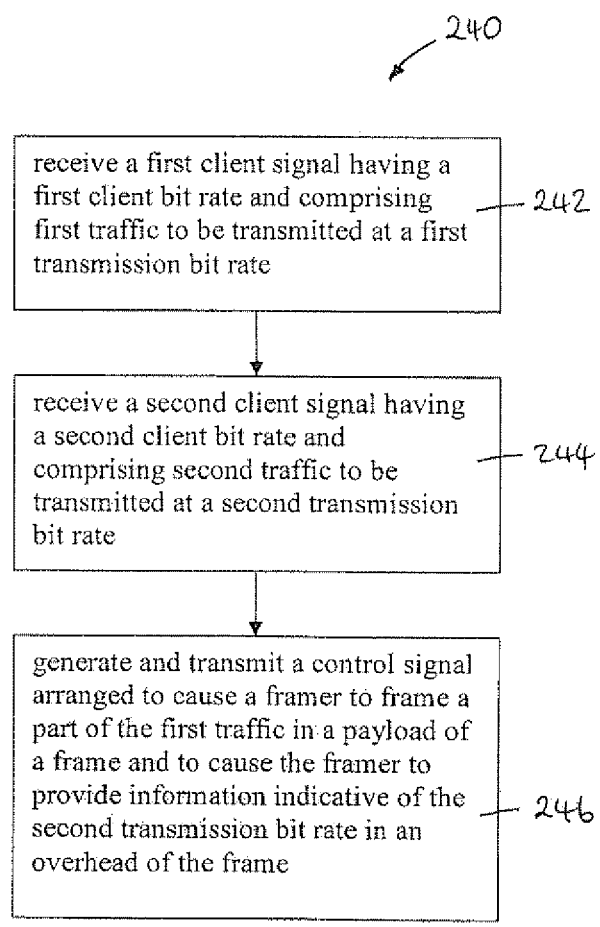
FIG. 19 shows the steps of a method of framing traffic for transmission in a communications network according to a twenty-fifth embodiment of the invention.

A twenty-fifth embodiment of the invention provides a method 240 of framing traffic for transmission in a communications network. The steps of the method 240 are shown in FIG. 19.

The method 240 comprises receiving a first client signal having a first client bit rate and comprising first traffic to be transmitted. at a first transmission bit rate 242 and receiving a second client signal having a second client bit rate and comprising second traffic to be transmitted at a second transmission bit rate 244. The method further comprises generating and transmitting a control signal 246. The control signal is arranged to cause a framer to frame part of the first traffic in a payload of a frame. The control signal is further arranged to cause the framer to provide information indicative of the second transmission bit rate in an overhead of the frame.

Information indicative of the transmission bit rate for a subsequent frame may therefore be sent with a first frame, which may enable receiver apparatus to prepare to receive traffic at the subsequent transmission bit rate.

Figure 20:
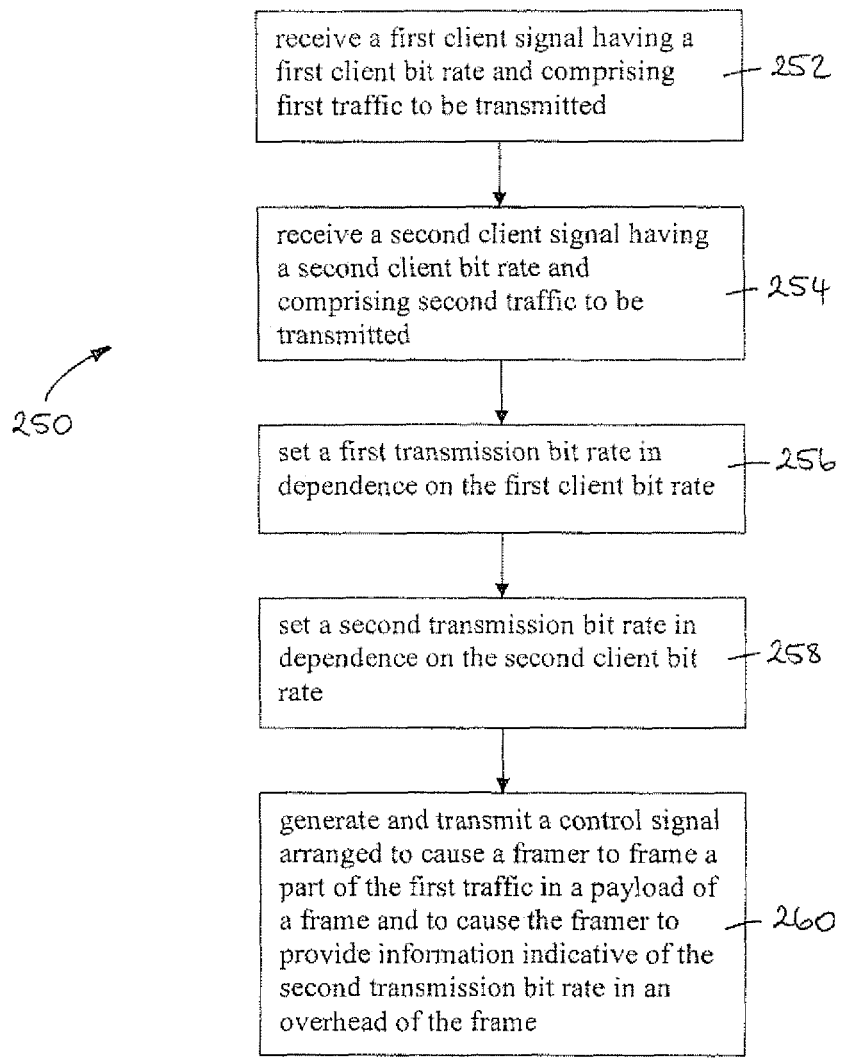
FIG. 20 shows the steps of a method of framing traffic for transmission in a communications network according to a twenty-sixth embodiment of the invention.

The steps of a method 250 of framing traffic for transmission in a communications network according to a twenty-sixth embodiment of the invention are shown in FIG. 20.

The method 250 comprises receiving a first client signal having a first client bit rate and comprising first traffic to be transmitted 252 and receiving a second client signal having a second client bit rate and comprising second traffic to be transmitted 254. The method comprises setting a first transmission bit rate at which to transmit the first traffic in dependence on the first client bit rate 256 and setting a second transmission bit rate at which to transmit the second traffic in dependence on the second client bit rate 258.

The method 250 further comprises generating and transmitting a control signal arranged to cause a framer to frame a part of the first traffic in a payload of a frame 260. The control signal is further arranged to cause the framer to provide information indicative of the second transmission bit rate in an overhead of the frame 260.

The transmission bit rate may therefore be reduced in response to receiving client signal having a client bit rate which is less than a maximum transmission bit rate at which traffic can be transmitted across the network. Reducing the transmission bit rate may reduce power consumption during transmission of traffic. The method may enable power consumption to be varied to match the received traffic load. The method may enable traffic transmission to continue continuously but at a lower transmission bit rate than the maximum for the network and may thus enable the method to be used in connection with currently installed wavelength division multiplexed network infrastructure.

In a twenty-seventh embodiment of the invention the frames into which the traffic is framed are optical transport network (OTN) frames, as described above in relation to FIG. 6.

The information indicative of the second transmission bit rate may be provided in any available bytes of the overhead which are not being used in connection with transmission of the traffic. In particular, this information may be provided in one of: byte 15 of one of rows 1 and 2; one of bytes 13 to 15 of row 3; and one of bytes 9 to 14 and 16 of row 4.

Redundancy against transmission errors may be provided by using bytes in two or more of the rows 72 of the overhead 76, 78.

The information indicative of the second transmission bit rate comprises a plurality of bits coded to indicate that the second bit rate comprises one of: a master bit rate; one half of the master bit rate; one third of the master bit rate; and one quarter of the master bit rate.

In this example, 001 is used to indicate the master bit rate; 010 to indicate one half of the master bit rate; 100 to indicate one third of the master bit rate; and 110 to indicate one quarter of the master bit rate.

Figure 21:
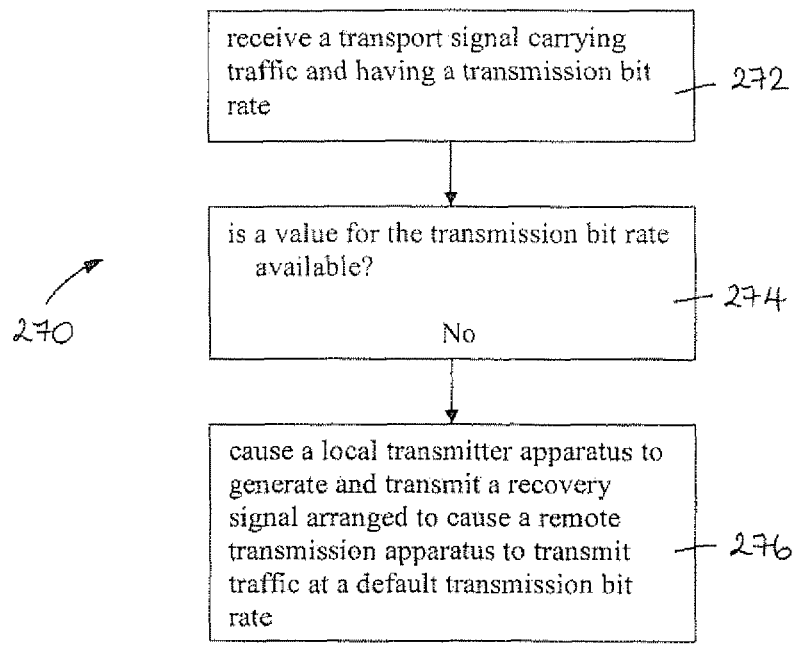
FIG. 21 shows the steps of a method of controlling transmission of traffic in a communications network according to a twenty-eighth embodiment of the invention.

The steps of a method 270 of controlling transmission of traffic in a communications network according to a twenty-eighth embodiment of the invention are shown in FIG. 21.

The method 270 comprises receiving a transport signal carrying traffic and having a transmission bit rate 272. The method further comprises determining whether a value for the transmission bit rate is available. If a value for the transmission bit rate is not available, the method comprises causing a local transmitter apparatus to transmit a recovery signal 276. The recovery signal is arranged to cause a remote transmission apparatus to transmit traffic at a default transmission bit rate.

Backward information may therefore be sent from the local transmitter apparatus to the remote transmission apparatus to inform the remote transmission apparatus that a bit rate is not available for the transport signal. Causing the remote transmission apparatus to transmit traffic at a default transmission bit rate may ease regaining of transmission bit rate and frame synchronisation.

Figure 22:
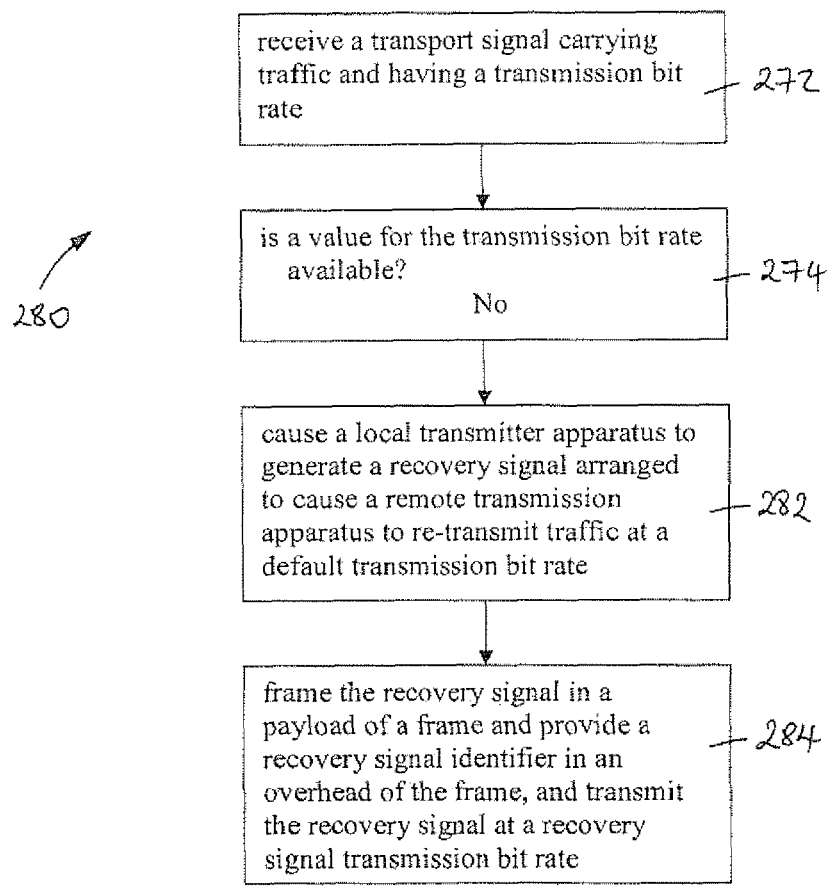
FIG. 22 shows the steps of a method of controlling transmission of traffic in a communications network according to a twenty-ninth embodiment of the invention.

The steps of a method 280 of controlling transmission of traffic in a communications network according to a twenty-ninth embodiment of the invention are shown in FIG. 22.

The method 280 of this embodiment is similar to the method 270 of the previous embodiment with the following modifications. The same reference numbers are retained for corresponding steps.

In this embodiment, the method comprises causing the local transmitter apparatus to generate a recovery signal arranged to cause the remote transmission apparatus to transmit traffic at a default transmission bit rate 282. The recovery signal is framed in a payload of a frame and a recovery signal identifier is provided in an overhead of the frame 284. The recovery signal is transmitted at a predetermined recovery signal transmission bit rate 284.

A thirtieth embodiment of the invention provides a data carrier having computer readable instructions embodied therein. The said computer readable instructions are for providing access to resources available on a processor. The computer readable instructions comprise instructions to cause the processor to perform the steps of any of the methods of transmitting traffic in a communications network according of the first to thirteenth embodiments described above.

The data carrier may comprise a memory device, such a compact disc, digital versatile disc or electronic memory, or may comprise a communications signal.

A thirty-first embodiment of the invention provides a data carrier having computer readable instructions embodied therein. The said computer readable instructions are for providing access to resources available on a processor. The computer readable instructions comprise instructions to cause the processor to perform the steps of any of the methods of framing traffic for transmission in a communications network of the twenty-third to twenty-fifth embodiments described above.

The data carrier may comprise a memory device, such a compact disc, digital versatile disc or electronic memory, or may comprise a communications signal.

A thirty-second embodiment of the invention provides a data carrier having computer readable instructions embodied therein. The said computer readable instructions are for providing access to resources available on a processor. The computer readable instructions comprise instructions to cause the processor to perform the steps of any of the method of controlling transmission of traffic in a communications network of the twenty-sixth to twenty-seventh embodiments described above.

The data carrier may comprise a memory device, such a compact disc, digital versatile disc or electronic memory, or may comprise a communications signal.

The invention claimed is:

1. A method of transmitting traffic in a communications network, the method comprising:
   receiving a client signal in a buffer, the client signal having a client bit rate and comprising traffic to be transmitted by a transmission element;
   monitoring an indicator indicative of said client bit rate, wherein the indicator indicative of said client bit rate corresponds to a fill rate or fill level of the buffer;
   setting a transmission bit rate of the transmission element at which to transmit the traffic, the transmission bit rate being set in dependence on said client bit rate determined from monitoring the indicator;
   wherein the transmission bit rate of the transmission element is reduced in response to receiving a said client bit rate which is less than a maximum transmission bit rate capability of the transmission element; and
   varying a clock rate to cause a transmission apparatus to transmit the traffic at the transmission bit rate.

2. The method as claimed in claim 1, wherein the transmission bit rate set by varying the clock rate comprises determining a divide ratio for a master bit rate in dependence on said client bit rate and generating and transmitting a control signal that comprises a clock signal generated by receiving a master clock signal at the master bit rate and dividing the master clock signal by the divide ratio.

3. The method as claimed in claim 1, wherein the method comprises:
   receiving a first client signal having a first client bit rate and comprising first traffic to be transmitted and subsequently receiving a second client signal having a second client bit rate and comprising second traffic to be transmitted;
   setting a first transmission bit rate in dependence on the first client bit rate and setting a second transmission bit rate in dependence on the second client bit rate;
   generating and transmitting a first control signal arranged to cause a framer to frame the first traffic into one or more first frames at the first transmission bit rate and a second control signal arranged to cause the framer to frame the second traffic into one or more subsequent frames at the second transmission bit rate, and, where the second transmission bit rate is different to the first transmission bit rate, the second control signal is further arranged to cause the framer to implement the change from the first transmission bit rate to the second transmission bit rate at a frame boundary.

4. The method as claimed in claim 3, wherein the first control signal is arranged to cause the framer to frame a part of the first traffic in a payload of said first frame and to cause the framer to provide information indicative of the second transmission bit rate in an overhead of said first frame.

5. The method as claimed in claim 4, wherein said first frame comprises an optical transport network frame.

6. The method as claimed in claim 1, wherein the method further comprises receiving transmitted traffic at receiver apparatus and determining whether a value for the transmission bit rate is available, and, if a value for the transmission bit rate is not available, causing a further transmission apparatus to generate and transmit a recovery signal arranged to cause the transmission apparatus to transmit traffic at a default transmission bit rate.

7. The method as claimed in claim 6, wherein the recovery signal is arranged to cause a remote transmission apparatus to re-transmit the traffic on a transport signal at the default transmission bit rate.

8. The method as claimed in claim 6, wherein the recovery signal is transmitted at a pre-determined recovery signal transmission bit rate and the method comprises framing the recovery signal in a payload of a frame and providing a recovery signal identifier in an overhead of the frame.

9. The method as claimed in claim 1, wherein the indicator comprises a client bit rate signal.

10. A communications network transmission element comprising:
    an input arranged to receive a client signal having a client bit rate and comprising traffic to be transmitted by a transmission element;
    client signal monitoring apparatus arranged to monitor an indicator indicative of said client bit rate, wherein the client signal monitoring apparatus comprises a buffer arranged to receive the client signal and the indicator indicative of said client bit rate corresponds to a fill rate or fill level of the buffer;
    transmission bit rate control apparatus arranged to set a transmission bit rate of the transmission element at which to transmit the received traffic, the transmission bit rate being set in dependence on said client bit rate determined from monitoring the indicator, wherein:
    the transmission bit rate of the transmission element is reduced in response to receiving a said client bit rate which is less than a maximum transmission bit rate capability of the transmission element, and
    the transmission bit rate control apparatus being further arranged to vary a clock rate arranged to cause a transmission apparatus to transmit the traffic at the transmission bit rate; and
    the transmission apparatus arranged to receive the clock rate and to generate and transmit a transport signal carrying the traffic.

11. The communications network transmission element as claimed in claim 10, wherein to vary the clock rate, the transmission bit rate control apparatus comprises a controller arranged to determine a divide ratio in dependence on said client bit rate, a clock arranged to generate a master clock signal having a master bit rate, and a divider arranged to receive the divide ratio and to divide the master clock signal at the divide ratio to form a control signal.

12. The communications network transmission element as claimed in claim 10 wherein the input is arranged to receive a first client signal having a first client bit rate and comprising first traffic to be transmitted and to subsequently receive a second client signal having a second client bit rate and comprising second traffic to be transmitted, and the transmission apparatus comprises a framer, and wherein the transmission bit rate control apparatus is arranged to set a first transmission bit rate in dependence on the first client bit rate at which to transmit the first traffic and to set a second transmission bit rate in dependence on the second client bit rate at which to transmit the second traffic, and the transmission bit rate control apparatus is further arranged to generate and transmit a first control signal arranged to cause the framer to frame the first traffic into one or more first frames at the first transmission bit rate and a second control signal arranged to cause the framer to frame the second traffic into one or more subsequent frames at the second transmission bit rate, and, where the second transmission bit rate is different to the first transmission bit rate, the second control signal is further arranged to cause the framer to implement the change from the first transmission bit rate to the second transmission bit rate at a frame boundary.

13. The communications network transmission element as claimed in claim 12, wherein the first control signal is arranged to cause the framer to frame a part of the first traffic in a payload of a said first frame and to cause the framer to provide information indicative of the second transmission bit rate in an overhead of the first frame.

14. The communications network transmission element as claimed in claim 12, wherein said first frame comprises an optical transport network frame.

15. The communications network transmission element as claimed in claim 10, wherein the client signal monitoring apparatus is arranged to monitor a client bit rate signal indicative of the client bit rate.

16. The communications network transmission element as claimed claim 10, wherein the communications network transmission element further comprises a receiver arranged to receive a recovery signal arranged to cause the transmission apparatus to transmit a transport signal carrying traffic at a default bit rate.

17. A communications network comprising:
a communication network transmission element including:
an input arranged to receive a client signal in a buffer, the client signal having a client bit rate and comprising traffic to be transmitted by a transmission element;
client signal monitoring apparatus arranged to monitor an indicator indicative of said client bit rate, wherein the indicator indicative of said client bit rate corresponds to a fill rate or fill level of the buffer;
transmission bit rate control apparatus arranged to:
set a transmission bit rate of the transmission element at which to transmit the received traffic, the transmission bit rate being set in dependence on said client bit rate determined from monitoring the indicator, wherein the transmission bit rate of the transmission element is reduced in response to receiving a said client bit rate which is less than a maximum transmission bit rate capability of the transmission element;
vary a clock rate arranged to cause a transmission apparatus to transmit the traffic at the transmission bit rate; and
receive the clock rate and transmit a transport signal carrying the traffic; and
a communication network element including:
an input arranged to receive a transport signal carrying traffic and having a transmission bit rate:
transport signal interrogation apparatus arranged to determine whether a value for the transmission bit rate is available and being further arranged to, if a value for the transmission bit rate is not available, generate a recovery signal arranged to cause a remote transmission apparatus to transmit a transport signal carrying traffic at a default transmission bit rate; and
local transmission apparatus arranged to transmit the recovery signal.

18. A method of framing traffic for transmission in a communications network, the method comprising:
receiving a first client signal having a first client bit rate and comprising first traffic to be transmitted at a first transmission bit rate by a transmission element;
receiving a second client signal in a buffer, the second client signal having a second client bit rate and comprising second traffic to be transmitted at a second transmission bit rate by the transmission element, the second transmission bit rate being set in dependence on said second client bit rate determined from monitoring a fill rate or fill level of the buffer, wherein the second transmission bit rate of the transmission element is reduced in response to the second client bit rate being less than a maximum transmission bit rate capability of the transmission element;
generating and transmitting a control signal arranged to cause a framer to frame a part of the first traffic in a payload of a frame and to cause the framer to provide information indicative of the second transmission bit rate in an overhead of the frame;
varying a clock rate to cause the first traffic to transmit at the first transmission bit rate and the second traffic to transmit at the second transmission bit rate.

19. The method as claimed in claim 18, wherein the frame comprises an optical transport network frame.

* * * * *